US010884383B2

(12) United States Patent
Leonard et al.

(10) Patent No.: US 10,884,383 B2
(45) Date of Patent: *Jan. 5, 2021

(54) ADVANCED CONTROL SYSTEMS FOR MACHINES

(71) Applicant: SAS Institute Inc., Cary, NC (US)

(72) Inventors: Michael James Leonard, Cary, NC (US); David Bruce Elsheimer, Clayton, NC (US); Yuelei Sui, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/388,119

(22) Filed: Apr. 18, 2019

(65) Prior Publication Data

US 2019/0250569 A1    Aug. 15, 2019

Related U.S. Application Data

(63) Continuation-in-part of application No. PCT/US2017/056777, filed on Oct. 19, 2017.

(Continued)

(51) Int. Cl.
*G05B 13/02* (2006.01)
*G05B 13/04* (2006.01)
(Continued)

(52) U.S. Cl.
CPC .......... *G05B 13/0255* (2013.01); *G05B 11/01* (2013.01); *G05B 13/0265* (2013.01);
(Continued)

(58) Field of Classification Search
CPC ............................ G05B 13/0255; G05B 15/02
See application file for complete search history.

(56) References Cited

U.S. PATENT DOCUMENTS

2007/0129912 A1    6/2007 Inoue et al.
2007/0239753 A1    10/2007 Leonard
(Continued)

OTHER PUBLICATIONS

Alharbi et al., "A New Approach for Selecting the Number of the Eigenvalues in Singular Spectrum Analysis", Journal of the Franklin Institute, vol. 353, 2016, pp. 1-16.

(Continued)

*Primary Examiner* — Carlos R Ortiz Rodriguez
(74) *Attorney, Agent, or Firm* — Kilpatrick Townsend & Stockton LLP

(57) ABSTRACT

Machines can be controlled using advanced control systems that implement an automated version of singular spectrum analysis (SSA). For example, a control system can perform SSA on a time series having one or more time-dependent variables by: generating a trajectory matrix from the time series, performing singular value decomposition on the trajectory matrix to determine elementary matrices; and categorizing the elementary matrices into groups. The elementary matrices can be automatically categorized into the groups by: generating one or more w-correlation matrices based on spectral components associated with the time series, determining w-correlation values based on the one or more w-correlation matrices; categorizing the w-correlation values into a predefined number of w-correlation sets, and forming the groups based on the predefined number of w-correlation sets. The control system can then generate a predictive forecast using the groups and control operation of a machine using the predictive forecast.

27 Claims, 20 Drawing Sheets

Related U.S. Application Data

(60) Provisional application No. 62/433,002, filed on Dec. 12, 2016, provisional application No. 62/409,964, filed on Oct. 19, 2016.

(51) Int. Cl.

| | |
|---|---|
| *G06F 17/16* | (2006.01) |
| *G05B 11/01* | (2006.01) |
| *G05B 23/02* | (2006.01) |
| *G06F 17/18* | (2006.01) |
| *G06F 16/00* | (2019.01) |
| *G05B 15/02* | (2006.01) |
| *G06N 3/04* | (2006.01) |

(52) U.S. Cl.
CPC .......... *G05B 13/048* (2013.01); *G05B 15/02* (2013.01); *G05B 23/0283* (2013.01); *G06F 16/00* (2019.01); *G06F 17/16* (2013.01); *G06F 17/18* (2013.01); *G06N 3/0445* (2013.01)

(56) References Cited

U.S. PATENT DOCUMENTS

2012/0310939 A1  12/2012 Lee et al.
2014/0108314 A1  4/2014 Chen et al.

OTHER PUBLICATIONS

Alonso et al., "Analysis of the Structure of Vibration Signals for Tool Wear Detection", Mechanical Systems and Signal Processing, vol. 22, 2008, pp. 735-748.
Awichi et al., "Improving SSA Predictions by Inverse Distance Weighting", REVSTAT—Statistical Journal vol. 11, No. 1, Mar. 2013, pp. 105-119.
Claessen et al., "A beginner's guide to SSA (Singular Spectrum Analysis)", 22 pages.
Cloete, "Singular Spectrum Analysis for time series forecasting in Python", retrieved via internet on Mar. 12, 2019 at https://github.com/aj-cloete/pySSA, 1 page.
D'Arcy, "Introducing SSA for Time Series Decomposition", retrieved via internet on Mar. 12, 2019 at https://www.kaggle.com/jdarcy/introducing-ssa-for-time-series-decomposition, 41 pages.
Dirie et al., "Contrastive Multivariate Singular Spectrum Analysis," Workshop on Modeling and Decision-Making in the Spatiotemporal Domain, 32nd Conference on Neural Information Processing Systems (NIPS 2018), Montréal, Canada, 2018, 11 pages.
Golyandina et al., "Analysis of Time Series Structure: SSA and Related Techniques", Chapman & Hall/CRC, 2001, Chapter 4, pp. 219-236.
Golyandina et al., "Basic Singular Spectrum Analysis and Forecasting with R", Computational Statistics & Data Analysis, 2013, pp. 934-954.
Golyandina et al., "Multivariate and 2D Extensions of Singular Spectrum Analysis with the Rssa Package," Journal of Statistical Software, v.67, Issue 2, Sep. 19, 2014, 77 pages.
Golyandina et al., "Singular Spectrum Analysis for Time Series (Chapter 2 Basic SSA)", Springer Briefs in Statistics, 2013, pp. 11-70.
Groth, "Multichannel Singular Spectrum Analysis—Beginners Guide", retrieved via internet on Mar. 12, 2019 at https://www.mathworks.com/matlabcentral/fileexchange/58968-multichannel-singular-spectrum-analysis-beginners-guide, 3 pages.
Groth, "Multivariate Singular Spectrum Analysis", presentation in Oldenburg, Germany on Mar. 17, 2010, 47 pages.
Hassani, "A Brief Introduction to Singular Spectrum Analysis", Cardiff School of Mathematics, Cardiff University, UK, 2010, 11 pages.
Hassani et al., "Multivariate Singular Spectrum Analysis: a General View and New Vector Forecasting Approach", International Journal of Energy and Statistics, vol. 1, No. 1, 2013, pp. 55-83.
Hassani, "Singular Spectrum Analysis: Methodology and Comparison", Journal of Data Science, vol. 5, No. 2, Apr. 1, 2007, pp. 239-257.
Helmus et al., "Nmrglue: an Open Source Python Package for the Analysis of Multidimensional NMR Data", Journal of Biomolecular NMR, vol. 55, No. 4, Apr. 2013pp. 355-367.
International Search Report and Written Opinion for PCT Application No. PCT/US2017/056777, dated Dec. 29, 2017, 14 pages.
Karmakar et al., "Supplementary Information for: Decreasing intensity of monsoon low-frequency intraseasonal variability over India", 10 pages.
Katovich, "Python implementation of Multivariate Singular Spectrum Analysis (MSSA)", retrieved via internet on Mar. 12, 2019 at https://github.com/kieferk/pymssa, 23 pages.
Liu et al., "Singular Spectrum Analysis Based Structural Damage Detection From Nonlinear Vibration Measurements Containing Noise", Noise Control Engineering Journal vol. 63, No. 5, Jan. 1, 2015, pp. 402-414.
Miranian et al., "Day-Ahead Electricity Price Analysis and Forecasting by Singular Spectrum Analysis", The Institution of Engineering and Technology, vol. 7, No. 4, 2013, pp. 337-346.
Raynaud et al., "SpanLib—Spectral Analysis Library", retrieved via internet on Mar. 12, 2019 at http://spanlib.sourceforge.net/doc/spanlib.html, 17 pages.
Sanarico, "SingularSpectrumAnalysis with Rssa", presentation on Jun. 4, 2014, 28 pages.
Shang et al., "A Hybrid Short-Term Traffic Flow Prediction Model Based on Singular Spectrum Analysis and Kernel Extreme Learning Machine", PLoS One, DOI: 10.1371/journal.pone.0161259, vol. 11, No. 8, Aug. 23, 2016, 25 pages.
UCLA, "SSA-MTM Toolkit for Spectral Analysis", retrieved via internet on Mar. 12, 2019 at http://research.atmos.ucla.edu/tcd/ssa/, 7 pages.
UCLA, "Theoretical Climate Dynamics—Multichannel SSA (M-SSA)", retrieved via the internet on Mar. 12, 2019 at https://dept.atmos.ucla.edu/tcd/multichannel-ssa-m-ssa, 4 pages.
Wikipedia, "Singular Spectrum Analysis", https://en.wikipedia.org/wiki/Singular_spectrum_analysis, page edited on Sep. 11, 2017, 11 pages.

| Obs | GROUPINDEX | WINDOWINDEX |
|---|---|---|
| 1 | 1 | 1 |
| 2 | 2 | 2 |
| 3 | 2 | 3 |
| 4 | 3 | 4 |
| 5 | 3 | 5 |

FIG. 19

ADVANCED CONTROL SYSTEMS FOR MACHINES

REFERENCE TO RELATED APPLICATION

This application claims the benefit and priority under 35 U.S.C. § 120 as a continuation-in-part of co-pending PCT Application No. US2017/056777, filed Oct. 19, 2017, which claims the benefit of priority under 35 U.S.C. § 119(e) to U.S. Provisional Patent Application No. 62/433,002, filed Dec. 12, 2016, and U.S. Provisional Patent Application No. 62/409,964, filed Oct. 19, 2016, the entirety of each of which is hereby incorporated by reference herein.

TECHNICAL FIELD

The present disclosure relates generally to a control system for a machine. More specifically, but not by way of limitation, this disclosure relates to advanced control systems for machines.

BACKGROUND

Machines can be used to perform various processes. For example, industrial plants that process chemicals can include machines, such as heaters, furnaces, and fired heaters, that perform various steps to process the chemicals. Modern machines can be controlled using a variety of control systems to implement different operations and prevent failures.

SUMMARY

One example of the present disclosure includes and method involving receiving a time series having one or more time-dependent variables, and performing singular spectrum analysis on the time series at least partially by: generating a trajectory matrix from the time series, the trajectory matrix being a multi-dimensional representation of the time series, wherein the multi-dimensional representation of the time series has at least one dimension that is dependent on how many time-dependent variables are present in the time series; performing singular value decomposition on the trajectory matrix to generate elementary matrices; generating spectral components associated with the time series by performing diagonal averaging on the elementary matrices; and automatically categorizing the elementary matrices into a plurality of groups. The elementary matrices can be automatically categorized into the plurality of groups by: generating one or more w-correlation matrices based on the spectral components, each w-correlation matrix being generated by determining weighted correlations between a respective pair of the spectral components associated with a respective time-dependent variable present in the time series; determining w-correlation values based on the one or more w-correlation matrices; categorizing the w-correlation values into a predefined number of w-correlation sets such that, for each w-correlation set in the predefined number of w-correlation sets, all of the w-correlation values in the w-correlation set are above a predefined threshold value; and forming the plurality of groups based on the predefined number of w-correlation sets. Each respective group in the plurality of groups can include a respective subset of the elementary matrices corresponding to the w-correlation values in a respective w-correlation set among the predefined number of w-correlation sets. The method can also include determining a plurality of component time-series based on the plurality of groups. The method can further include generating a predictive forecast using the plurality of component time-series. Some or all of these steps can be implemented by a processing device.

A system of the present disclosure can include a processing device and a memory device including instructions that are executable by the processing device for implementing one or more operations. The operations can include receiving a time series having one or more time-dependent variables, and performing singular spectrum analysis on the time series at least partially by: generating a trajectory matrix from the time series, the trajectory matrix being a multi-dimensional representation of the time series, wherein the multi-dimensional representation of the time series has at least one dimension that is dependent on how many time-dependent variables are present in the time series; performing singular value decomposition on the trajectory matrix to generate elementary matrices; generating spectral components associated with the time series by performing diagonal averaging on the elementary matrices; and automatically categorizing the elementary matrices into a plurality of groups. The elementary matrices can be automatically categorized into the plurality of groups by: generating one or more w-correlation matrices based on the spectral components, each w-correlation matrix being generated by determining weighted correlations between a respective pair of the spectral components associated with a respective time-dependent variable present in the time series; determining w-correlation values based on the one or more w-correlation matrices; categorizing the w-correlation values into a predefined number of w-correlation sets such that, for each w-correlation set in the predefined number of w-correlation sets, all of the w-correlation values in the w-correlation set are above a predefined threshold value; and forming the plurality of groups based on the predefined number of w-correlation sets. Each respective group in the plurality of groups can include a respective subset of the elementary matrices corresponding to the w-correlation values in a respective w-correlation set among the predefined number of w-correlation sets. The operations can also include determining a plurality of component time-series based on the plurality of groups. The operations can further include generating a predictive forecast using the plurality of component time-series.

A non-transitory computer-readable medium of the present disclosure can include instructions that are executable by a processing device for causing the processing device to implement one or more operations. The operations can include receiving a time series having one or more time-dependent variables, and performing singular spectrum analysis on the time series at least partially by: generating a trajectory matrix from the time series, the trajectory matrix being a multi-dimensional representation of the time series, wherein the multi-dimensional representation of the time series has at least one dimension that is dependent on how many time-dependent variables are present in the time series; performing singular value decomposition on the trajectory matrix to generate elementary matrices; generating spectral components associated with the time series by performing diagonal averaging on the elementary matrices; and automatically categorizing the elementary matrices into a plurality of groups. The elementary matrices can be automatically categorized into the plurality of groups by: generating one or more w-correlation matrices based on the spectral components, each w-correlation matrix being generated by determining weighted correlations between a respective pair of the spectral components associated with a respective time-dependent variable present in the time series; determining w-correlation values based on the one or more w-correlation matrices; categorizing the w-correlation values into a predefined number of w-correlation sets such that, for each w-correlation set in the predefined number of w-correlation sets, all of the w-correlation values in the w-correlation set are above a predefined threshold value; and forming the plurality of groups based on the predefined number of w-correlation sets. Each respective group in the plurality of groups can include a respective subset of the elementary matrices corresponding to the w-correlation values in a respective w-correlation set among the predefined number of w-correlation sets. The operations can also include determining a plurality of component time-series based on the plurality of groups. The operations can further include generating a predictive forecast using the plurality of component time-series.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures:

FIG. 19 depicts a table showing an example of groups according to some aspects.

Figure 1:
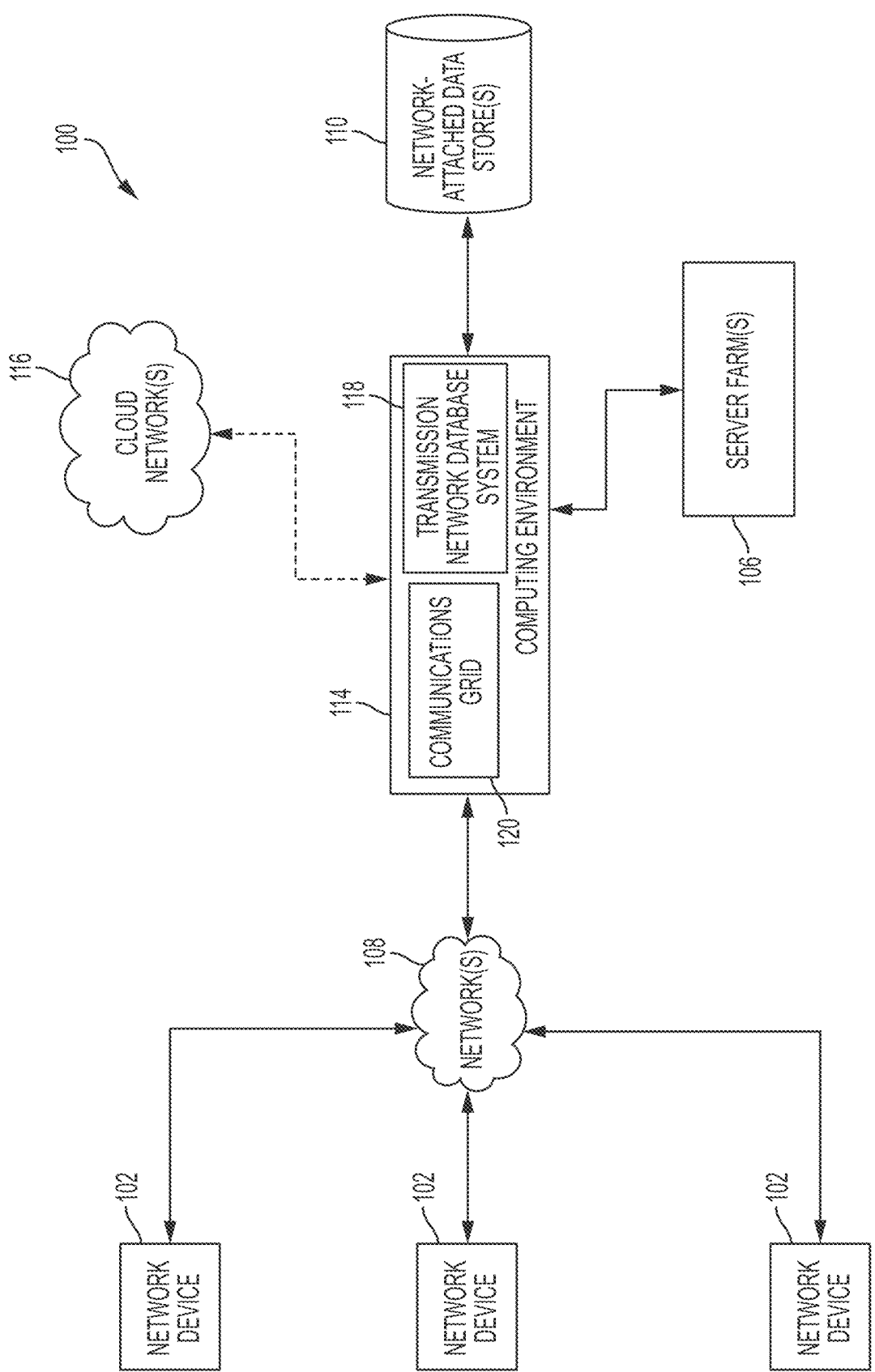
FIG. 1 is a block diagram of an example of the hardware components of a computing system according to some aspects.

In the appended figures, similar components or features can have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Certain aspects and features of the present disclosure relate to advanced control systems for machines. Modern machines can use a variety of control systems to implement various operations. Typically, these control systems can rely on data from sensors, feedback loops, and complex mathematical algorithms. But these control systems can be slow; require manual inputs; perform inadequately under a variety of conditions; and may be unable to prevent errors, failures, and other undesirable conditions from occurring.

Some examples of the present disclosure can overcome one or more of the abovementioned issues by providing a control system that can predict how a machine will perform in the future and adjust an operational setting of the machine to reduce the likelihood of an undesirable condition (e.g., an error or failure) from occurring. The control system can generate the predictions using an automated version of singular spectrum analysis. The control system can then analyze the predictions to determine, for example, if an error, failure, and other undesirable condition associated with the machine is going to occur in the future. If so, the control system can take appropriate preventative action (or corrective action) to prevent the undesirable condition from occurring. This can prevent damage to the machine and injuries.

As discussed above, some control systems of the present disclosure can predict how a machine will operate in the future by performing an automated version of singular spectrum analysis, in which singular spectrum analysis is performed with little or no human involvement. The automated version of singular spectrum analysis is different from traditional methods of performing singular spectrum analysis at least in part because traditional methods of performing singular spectrum analysis require a human to subjectively determine a spectral partition by visually analyzing graphs of elementary matrices and eigenvalues. Conversely, the automated version of singular spectrum analysis uses specific rules to automatically determine the spectral partition. The specific rules enable the automation of a specific process that previously could not be automated (e.g., because it was previously performed by humans using subjective determinations).

In some examples, the automated version of singular spectrum analysis can enable singular spectrum analysis to be performed on thousands or millions of time series at speeds that are impossible for humans to accomplish (e.g., in real time), which can enable the control system to make important predictions about a machine (e.g., if an undesirable condition is occurring or will occur) that would otherwise be unable to be made. This can result in better control systems that can more precisely control operation of the machine to avoid undesirable conditions, resulting in better machine performance.

As a particular example, a control system of the present disclosure can be used in an intelligent transport system that monitors traffic flow and adjusts traffic lights accordingly. The intelligent transport system can include a variety of sensors that stream real-time sensor data about, for example, the status of traffic lights back to the control system. The control system can analyze the sensor data using an automated version of singular spectrum analysis to determine, for example, if two traffic lights will have a green light at the same time in the near future, which could lead to a collision. If so, the control system can adjust the timing of one or both of the two traffic lights to avoid the collision.

FIGS. 1-12 depict examples of systems and methods usable for controlling operation of a machine using predictions according to some aspects. For example, FIG. 1 is a block diagram of an example of the hardware components of a computing system according to some aspects. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. The computing environment 114 may include one or more other systems. For example, computing environment 114 may include a database system 118 or a communications grid 120. The computing environment 114 can include one or more processing devices (e.g., distributed over one or more networks or otherwise in communication with one another) that, in some examples, can collectively be referred to as a processor or a processing device.

Data transmission network 100 also includes one or more network devices 102. Network devices 102 may include client devices that can communicate with computing environment 114. For example, network devices 102 may send data to the computing environment 114 to be processed, may send communications to the computing environment 114 to control different aspects of the computing environment or the data it is processing, among other reasons. Network devices 102 may interact with the computing environment 114 through a number of ways, such as, for example, over one or more networks 108.

In some examples, network devices 102 may provide a large amount of data, either all at once or streaming over a period of time (e.g., using event stream processing (ESP)), to the computing environment 114 via networks 108. For example, the network devices 102 can transmit electronic messages for use in creating predictions for controlling operation of a machine, all at once or streaming over a period of time, to the computing environment 114 via networks 108.

The network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices 102 themselves. Network devices 102 may also include sensors that monitor their environment or other devices to collect data regarding that environment or those devices, and such network devices 102 may provide data they collect over time. Network devices 102 may also include devices within the internet of things, such as devices within a home automation network. Some of these devices may be referred to as edge devices, and may involve edge-computing circuitry. Data may be transmitted by network devices 102 directly to computing environment 114 or to network-attached data stores, such as network-attached data stores 110 for storage so that the data may be retrieved later by the computing environment 114 or other portions of data transmission network 100. For example, the network devices 102 can transmit data usable for creating predictions to a network-attached data store 110 for storage. The computing environment 114 may later retrieve the data from the network-attached data store 110 and use the data to control operation of a machine using predictions.

Network-attached data stores 110 can store data to be processed by the computing environment 114 as well as any intermediate or final data generated by the computing system in non-volatile memory. But in certain examples, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated dynamically (e.g., on the fly). In this situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data stores may include storage other than primary storage located within computing environment 114 that is directly accessible by processors located therein. Network-attached data stores may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves or transitory electronic communications. Examples of a non-transitory medium may include, for example, a magnetic disk or tape, optical storage media such as compact disk or digital versatile disk, flash memory, memory or memory devices. A computer-program product may include code or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data.

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time-stamped data may be aggregated by time (e.g., into daily time period units) to generate time series data or structured hierarchically according to one or more dimensions (e.g., parameters, attributes, or variables). For example, data may be stored in a hierarchical data structure, such as a relational online analytical processing (ROLAP) or multidimensional online analytical processing (MOLAP) database, or may be stored in another tabular form, such as in a flat-hierarchy form.

Data transmission network 100 may also include one or more server farms 106. Computing environment 114 may route select communications or data to the sever farms 106 or one or more servers within the server farms 106. Server farms 106 can be configured to provide information in a predetermined manner. For example, server farms 106 may access data to transmit in response to a communication. Server farms 106 may be separately housed from each other device within data transmission network 100, such as computing environment 114, or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more websites, sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain examples, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network 116 can dynamically scale to meet the needs of its users. The cloud network 116 may include one or more computers, servers, or systems. In some examples, the computers, servers, or systems that make up the cloud network 116 are different from the user's own on-premises computers, servers, or systems. For example, the cloud network 116 may host an application, and a user may, via a communication network such as the Internet, order and use the application on demand. In some examples, the cloud network 116 may host an application for creating predictions (e.g., for controlling operation of a machine).

While each device, server, and system in FIG. 1 is shown as a single device, multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between server farms 106 and computing environment 114, or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired or wireless networks may be implemented using routers, access points, bridges, gateways, or the like, to connect devices in the network 108. The networks 108 can be incorporated entirely within or can include an intranet, an extranet, or a combination thereof. In one example, communications between two or more systems or devices can be achieved by a secure communications protocol, such as secure sockets layer (SSL) or transport layer security (TLS). In addition, data or transactional details may be encrypted.

Some aspects may utilize the Internet of Things (IoT), where things (e.g., machines, devices, phones, sensors) can be connected to networks and the data from these things can be collected and processed within the things or external to the things. For example, the IoT can include sensors in many different devices, and high value analytics can be applied to identify hidden relationships and drive increased efficiencies. This can apply to both big data analytics and real-time (e.g., ESP) analytics.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The computing nodes in the communications grid 120 and the transmission network database system 118 may share the same processor hardware, such as processors that are located within computing environment 114.

In some examples, the computing environment 114, a network device 102, or both can implement one or more processes for creating predictions (e.g., for controlling operation of a machine). For example, the computing environment 114, a network device 102, or both can implement one or more versions of the processes discussed with respect to any of the figures.

Figure 2:
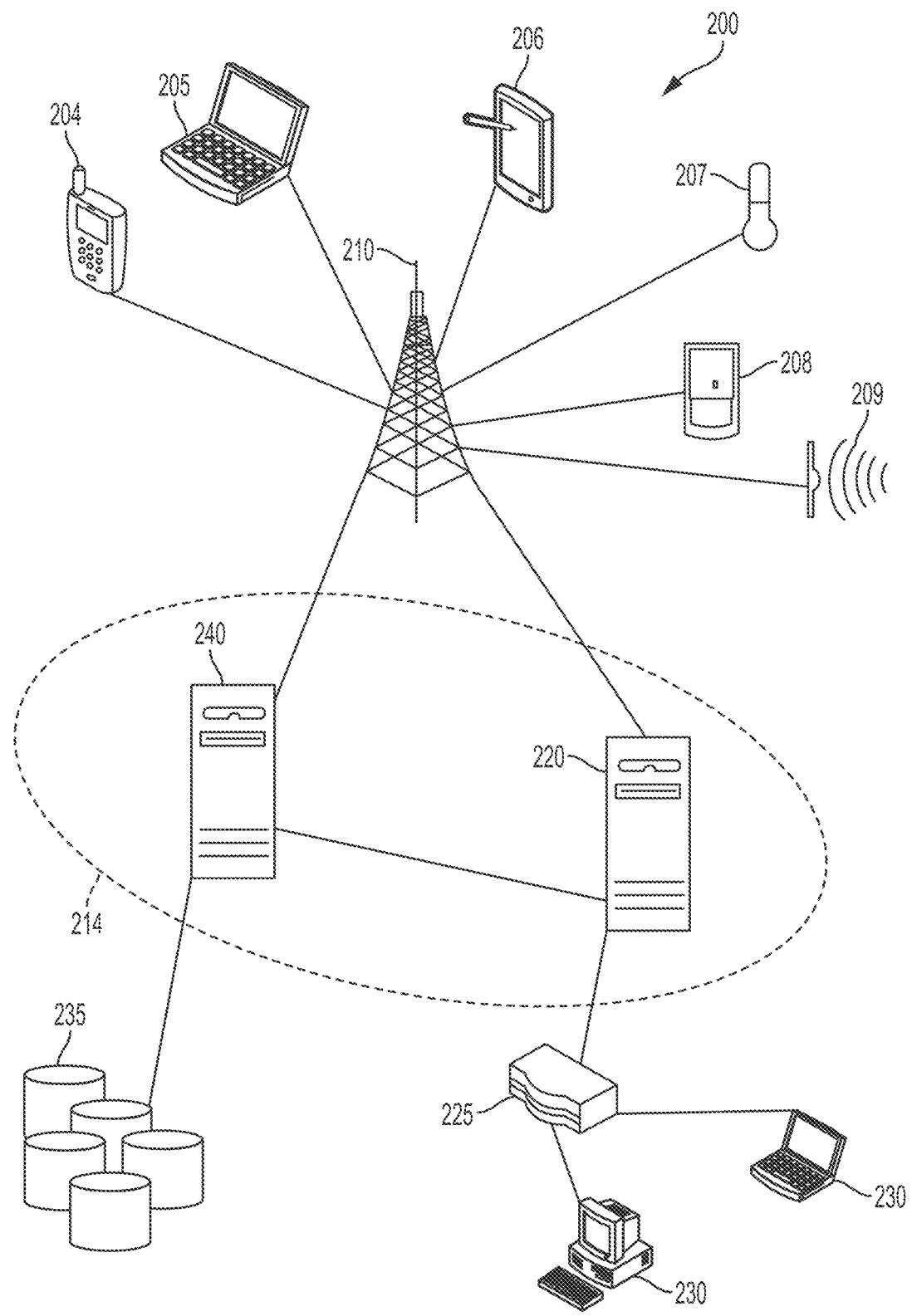
FIG. 2 is an example of devices that can communicate with each other over an exchange system and via a network according to some aspects.

FIG. 2 is an example of devices that can communicate with each other over an exchange system and via a network according to some aspects. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). In some examples, the communication can include times series data. The communication can be routed to another network device, such as network devices 205-209, via base station 210. The communication can also be routed to computing environment 214 via base station 210. In some examples, the network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems. The network devices may detect and record data related to the environment that it monitors, and transmit that data to computing environment 214.

The network devices 204-209 may also perform processing on data it collects before transmitting the data to the computing environment 214, or before deciding whether to transmit data to the computing environment 214. For example, network devices 204-209 may determine whether data collected meets certain rules, for example by comparing data or values calculated from the data and comparing that data to one or more thresholds. The network devices 204-209 may use this data or comparisons to determine if the data is to be transmitted to the computing environment 214 for further use or processing. In some examples, the network devices 204-209 can pre-process the data prior to transmitting the data to the computing environment 214. For example, the network devices 204-209 can reformat the data before transmitting the data to the computing environment 214 for further processing (e.g., analyzing the data to control operation of a machine).

Computing environment 214 may include machines 220, 240. Although computing environment 214 is shown in FIG. 2 as having two machines 220, 240, computing environment 214 may have only one machine or may have more than two machines. The machines 220, 240 that make up computing environment 214 may include specialized computers, servers, or other machines that are configured to individually or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze or store data from or pertaining to communications, client device operations, client rules, or user-associated actions stored at one or more data stores 235. Such data may influence communication routing to the devices within computing environment 214, how data is stored or processed within computing environment 214, among other actions.

Notably, various other devices can further be used to influence communication routing or processing between devices within computing environment 214 and with devices outside of computing environment 214. For example, as shown in FIG. 2, computing environment 214 may include a machine 240 that is a web server. Computing environment 214 can retrieve data of interest, such as client information (e.g., product information, client rules, etc.), technical product details, news, blog posts, e-mails, forum posts, electronic documents, social media posts (e.g., Twitter™ posts or Facebook™ posts), time series data, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices 204-209 may receive data periodically and in real time from a web server or other source. Devices within computing environment 214 may also perform pre-analysis on data it receives to determine if the data received should be processed as part of an ongoing project. For example, as part of a project in which the operation of a machine is controlled based on data, the computing environment 214 can perform a pre-analysis of the data. The pre-analysis can include determining whether the data is in a correct format for creating predictions using the data and, if not, reformatting the data into the correct format.

Figure 3:
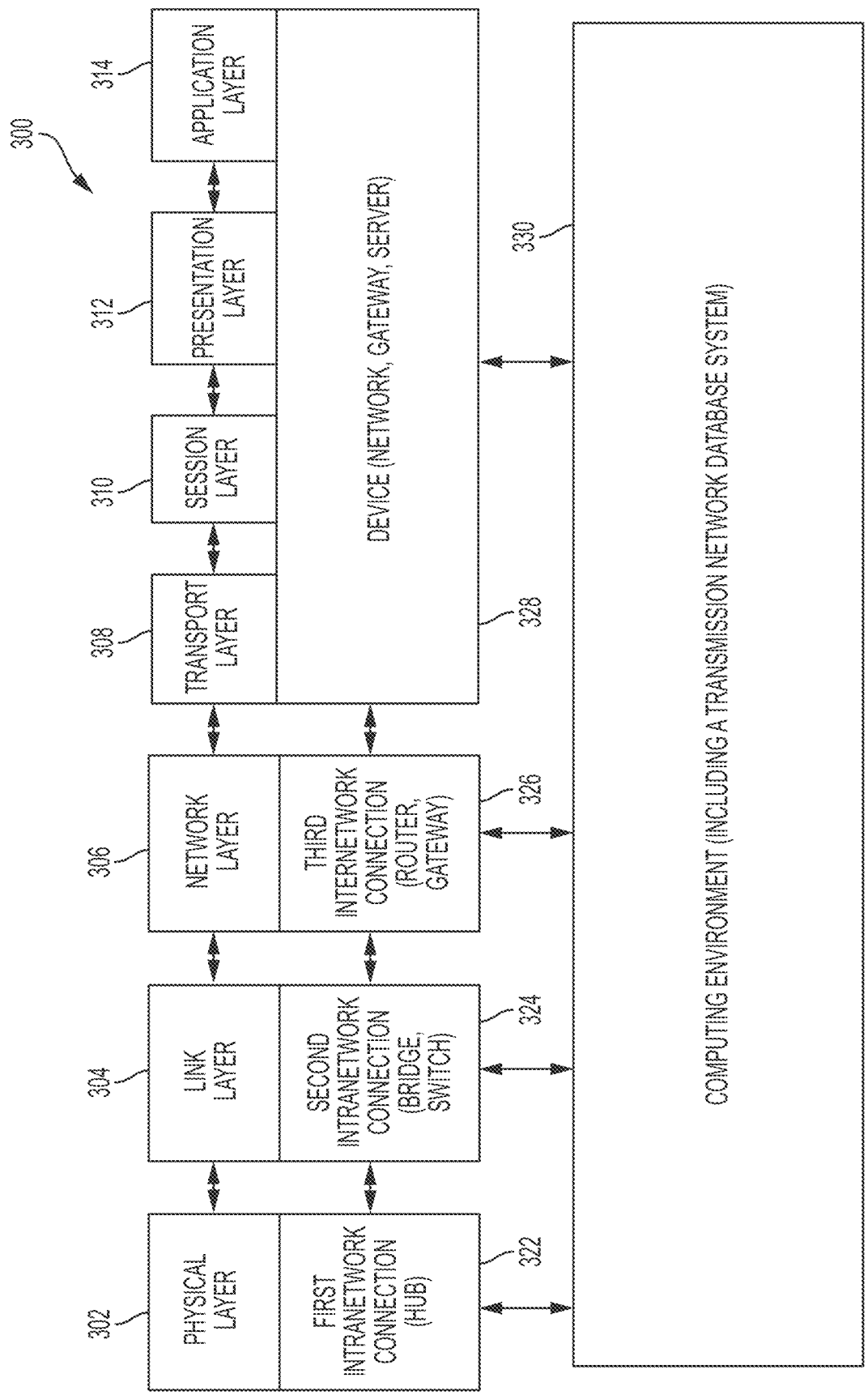
FIG. 3 is a block diagram of a model of an example of a communications protocol system according to some aspects.

FIG. 3 is a block diagram of a model of an example of a communications protocol system according to some aspects.

More specifically, FIG. 3 identifies operation of a computing environment in an Open Systems Interaction model that corresponds to various connection components. The model 300 shows, for example, how a computing environment, such as computing environment (or computing environment 214 in FIG. 2) may communicate with other devices in its network, and control how communications between the computing environment and other devices are executed and under what conditions.

The model 300 can include layers 302-314. The layers 302-314 are arranged in a stack. Each layer in the stack serves the layer one level higher than it (except for the application layer, which is the highest layer), and is served by the layer one level below it (except for the physical layer 302, which is the lowest layer). The physical layer 302 is the lowest layer because it receives and transmits raw bites of data, and is the farthest layer from the user in a communications system. On the other hand, the application layer is the highest layer because it interacts directly with a software application.

As noted, the model 300 includes a physical layer 302. Physical layer 302 represents physical communication, and can define parameters of that physical communication. For example, such physical communication may come in the form of electrical, optical, or electromagnetic communications. Physical layer 302 also defines protocols that may control communications within a data transmission network.

Link layer 304 defines links and mechanisms used to transmit (e.g., move) data across a network. The link layer manages node-to-node communications, such as within a grid-computing environment. Link layer 304 can detect and correct errors (e.g., transmission errors in the physical layer 302). Link layer 304 can also include a media access control (MAC) layer and logical link control (LLC) layer.

Network layer 306 can define the protocol for routing within a network. In other words, the network layer coordinates transferring data across nodes in a same network (e.g., such as a grid-computing environment). Network layer 306 can also define the processes used to structure local addressing within the network.

Transport layer 308 can manage the transmission of data and the quality of the transmission or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt or format data based on data types known to be accepted by an application or network layer.

Application layer 314 interacts directly with software applications and end users, and manages communications between them. Application layer 314 can identify destinations, local resource states or availability or communication content or formatting using the applications.

For example, a communication link can be established between two devices on a network. One device can transmit an analog or digital representation of an electronic message that includes a data set to the other device. The other device can receive the analog or digital representation at the physical layer 302. The other device can transmit the data associated with the electronic message through the remaining layers 304-314. The application layer 314 can receive data associated with the electronic message. The application layer 314 can identify one or more applications, such as an application for creating predictions (e.g., for controlling operation of a machine), to which to transmit data associated with the electronic message. The application layer 314 can transmit the data to the identified application.

Intra-network connection components 322, 324 can operate in lower levels, such as physical layer 302 and link layer 304, respectively. For example, a hub can operate in the physical layer, a switch can operate in the physical layer, and a router can operate in the network layer. Inter-network connection components 326, 328 are shown to operate on higher levels, such as layers 306-314. For example, routers can operate in the network layer and network devices can operate in the transport, session, presentation, and application layers.

A computing environment 330 can interact with or operate on, in various examples, one, more, all or any of the various layers. For example, computing environment 330 can interact with a hub (e.g., via the link layer) to adjust which devices the hub communicates with. The physical layer 302 may be served by the link layer 304, so it may implement such data from the link layer 304. For example, the computing environment 330 may control which devices from which it can receive data. For example, if the computing environment 330 knows that a certain network device has turned off, broken, or otherwise become unavailable or unreliable, the computing environment 330 may instruct the hub to prevent any data from being transmitted to the computing environment 330 from that network device. Such a process may be beneficial to avoid receiving data that is inaccurate or that has been influenced by an uncontrolled environment. As another example, computing environment 330 can communicate with a bridge, switch, router or gateway and influence which device within the system (e.g., system 200) the component selects as a destination. In some examples, computing environment 330 can interact with various layers by exchanging communications with equipment operating on a particular layer by routing or modifying existing communications. In another example, such as in a grid-computing environment, a node may determine how data within the environment should be routed (e.g., which node should receive certain data) based on certain parameters or information provided by other layers within the model.

The computing environment 330 may be a part of a communications grid environment, the communications of which may be implemented as shown in the protocol of FIG. 3. For example, referring back to FIG. 2, one or more of machines 220 and 240 may be part of a communications grid-computing environment. A gridded computing environment may be employed in a distributed system with non-interactive workloads where data resides in memory on the machines, or compute nodes. In such an environment, analytic code, instead of a database management system, can control the processing performed by the nodes. Data is co-located by pre-distributing it to the grid nodes, and the analytic code on each node loads the local data into memory. Each node may be assigned a particular task, such as a portion of a processing project, or to organize or control other nodes within the grid. For example, each node may be assigned a portion of a processing task for controlling operation of a machine using predictions.

Figure 4:
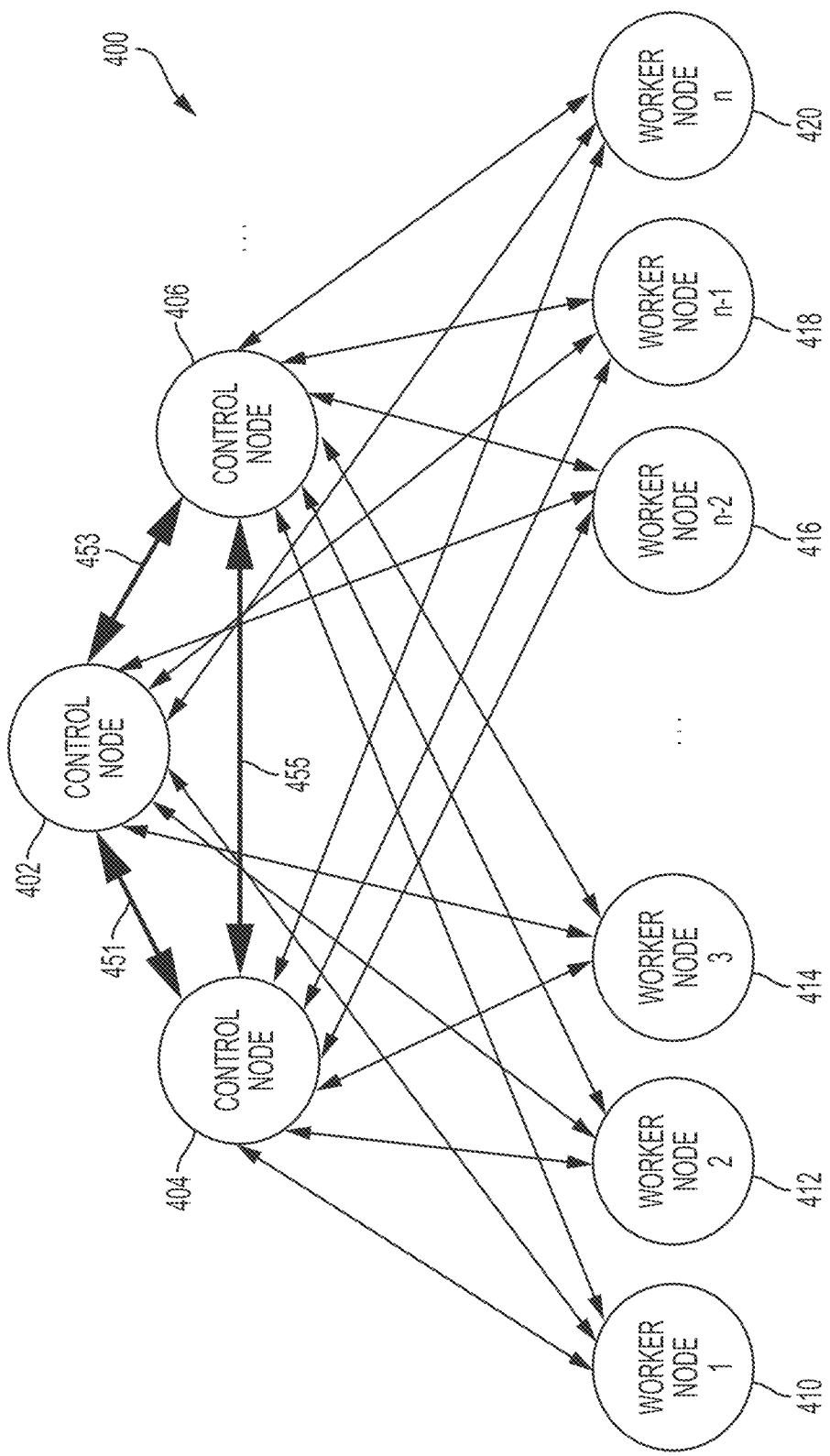
FIG. 4 is a hierarchical diagram of an example of a communications grid computing system including a variety of control and worker nodes according to some aspects.

FIG. 4 is a hierarchical diagram of an example of a communications grid computing system 400 including a variety of control and worker nodes according to some aspects. Communications grid computing system 400 includes three control nodes and one or more worker nodes. Communications grid computing system 400 includes control nodes 402, 404, and 406. The control nodes are communicatively connected via communication paths 451, 453, and 455. The control nodes 402-406 may transmit information (e.g., related to the communications grid or notifications) to and receive information from each other. Although communications grid computing system 400 is shown in FIG. 4 as including three control nodes, the communications grid may include more or less than three control nodes.

Communications grid computing system 400 (which can be referred to as a "communications grid") also includes one or more worker nodes. Shown in FIG. 4 are six worker nodes 410-420. Although FIG. 4 shows six worker nodes, a communications grid can include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid computing system 400 may be connected (wired or wirelessly, and directly or indirectly) to control nodes 402-406. Each worker node may receive information from the control nodes (e.g., an instruction to perform work on a project) and may transmit information to the control nodes (e.g., a result from work performed on a project). Furthermore, worker nodes may communicate with each other directly or indirectly. For example, worker nodes may transmit data between each other related to a job being performed or an individual task within a job being performed by that worker node. In some examples, worker nodes may not be connected (communicatively or otherwise) to certain other worker nodes. For example, a worker node 410 may only be able to communicate with a particular control node 402. The worker node 410 may be unable to communicate with other worker nodes 412-420 in the communications grid, even if the other worker nodes 412-420 are controlled by the same control node 402.

A control node 402-406 may connect with an external device with which the control node 402-406 may communicate (e.g., a communications grid user, such as a server or computer, may connect to a controller of the grid). For example, a server or computer may connect to control nodes 402-406 and may transmit a project or job to the node, such as a project or job related to creating predictions for controlling operation of a machine. The project may include the data set. The data set may be of any size and can include a time series. Once the control node 402-406 receives such a project including a large data set, the control node may distribute the data set or projects related to the data set to be performed by worker nodes. Alternatively, for a project including a large data set, the data set may be receive or stored by a machine other than a control node 402-406 (e.g., a Hadoop data node).

Control nodes 402-406 can maintain knowledge of the status of the nodes in the grid (e.g., grid status information), accept work requests from clients, subdivide the work across worker nodes, and coordinate the worker nodes, among other responsibilities. Worker nodes 412-420 may accept work requests from a control node 402-406 and provide the control node with results of the work performed by the worker node. A grid may be started from a single node (e.g., a machine, computer, server, etc.). This first node may be assigned or may start as the primary control node 402 that will control any additional nodes that enter the grid.

When a project is submitted for execution (e.g., by a client or a controller of the grid) it may be assigned to a set of nodes. After the nodes are assigned to a project, a data structure (e.g., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node 402 receives a project, the primary control node may distribute portions of the project to its worker nodes for execution. For example, a project for creating predictions can be initiated on communications grid computing system 400. A primary control node can control the work to be performed for the project in order to complete the project as requested or instructed. The primary control node may distribute work to the worker nodes 412-420 based on various factors, such as which subsets or portions of projects may be completed most efficiently and in the correct amount of time. For example, a worker node 412 may create a prediction using at least a portion of data that is already local (e.g., stored on) the worker node. The primary control node also coordinates and processes the results of the work performed by each worker node 412-420 after each worker node 412-420 executes and completes its job. For example, the primary control node may receive a result from one or more worker nodes 412-420, and the primary control node may organize (e.g., collect and assemble) the results received and compile them to produce a complete result for the project received from the end user.

Any remaining control nodes, such as control nodes 404, 406, may be assigned as backup control nodes for the project. In an example, backup control nodes may not control any portion of the project. Instead, backup control nodes may serve as a backup for the primary control node and take over as primary control node if the primary control node were to fail. If a communications grid were to include only a single control node 402, and the control node 402 were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes 402-406, including a backup control node, may be beneficial.

In some examples, the primary control node may open a pair of listening sockets to add another node or machine to the grid. A socket may be used to accept work requests from clients, and the second socket may be used to accept connections from other grid nodes. The primary control node may be provided with a list of other nodes (e.g., other machines, computers, servers, etc.) that can participate in the grid, and the role that each node can fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it can check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. But, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404, 406 (and, for example, to other control or worker nodes 412-420 within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes 410-420 in the communications grid, unique identifiers of the worker nodes 410-420, or their relationships with the primary control node 402) and the status of a project (including, for example, the status of each worker node's portion of the project). The snapshot may also include analysis or results received from worker nodes 410-420 in the communications grid. The backup control nodes 404, 406 may receive and store the backup data received from the primary control node 402. The backup control nodes 404, 406 may transmit a request for such a snapshot (or other information) from the primary control node 402, or the primary control node 402 may send such information periodically to the backup control nodes 404, 406.

As noted, the backup data may allow a backup control node 404, 406 to take over as primary control node if the primary control node 402 fails without requiring the communications grid to start the project over from scratch. If the primary control node 402 fails, the backup control node 404, 406 that will take over as primary control node may retrieve the most recent version of the snapshot received from the primary control node 402 and use the snapshot to continue the project from the stage of the project indicated by the backup data. This may prevent failure of the project as a whole.

A backup control node 404, 406 may use various methods to determine that the primary control node 402 has failed. In one example of such a method, the primary control node 402 may transmit (e.g., periodically) a communication to the backup control node 404, 406 that indicates that the primary control node 402 is working and has not failed, such as a heartbeat communication. The backup control node 404, 406 may determine that the primary control node 402 has failed if the backup control node has not received a heartbeat communication for a certain predetermined period of time. Alternatively, a backup control node 404, 406 may also receive a communication from the primary control node 402 itself (before it failed) or from a worker node 410-420 that the primary control node 402 has failed, for example because the primary control node 402 has failed to communicate with the worker node 410-420.

Different methods may be performed to determine which backup control node of a set of backup control nodes (e.g., backup control nodes 404, 406) can take over for failed primary control node 402 and become the new primary control node. For example, the new primary control node may be chosen based on a ranking or "hierarchy" of backup control nodes based on their unique identifiers. In an alternative example, a backup control node may be assigned to be the new primary control node by another device in the communications grid or from an external device (e.g., a system infrastructure or an end user, such as a server or computer, controlling the communications grid). In another alternative example, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative example, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed. In some examples, a communications grid computing system 400 can be used to create predictions (e.g., for controlling operation of a machine).

Figure 5:
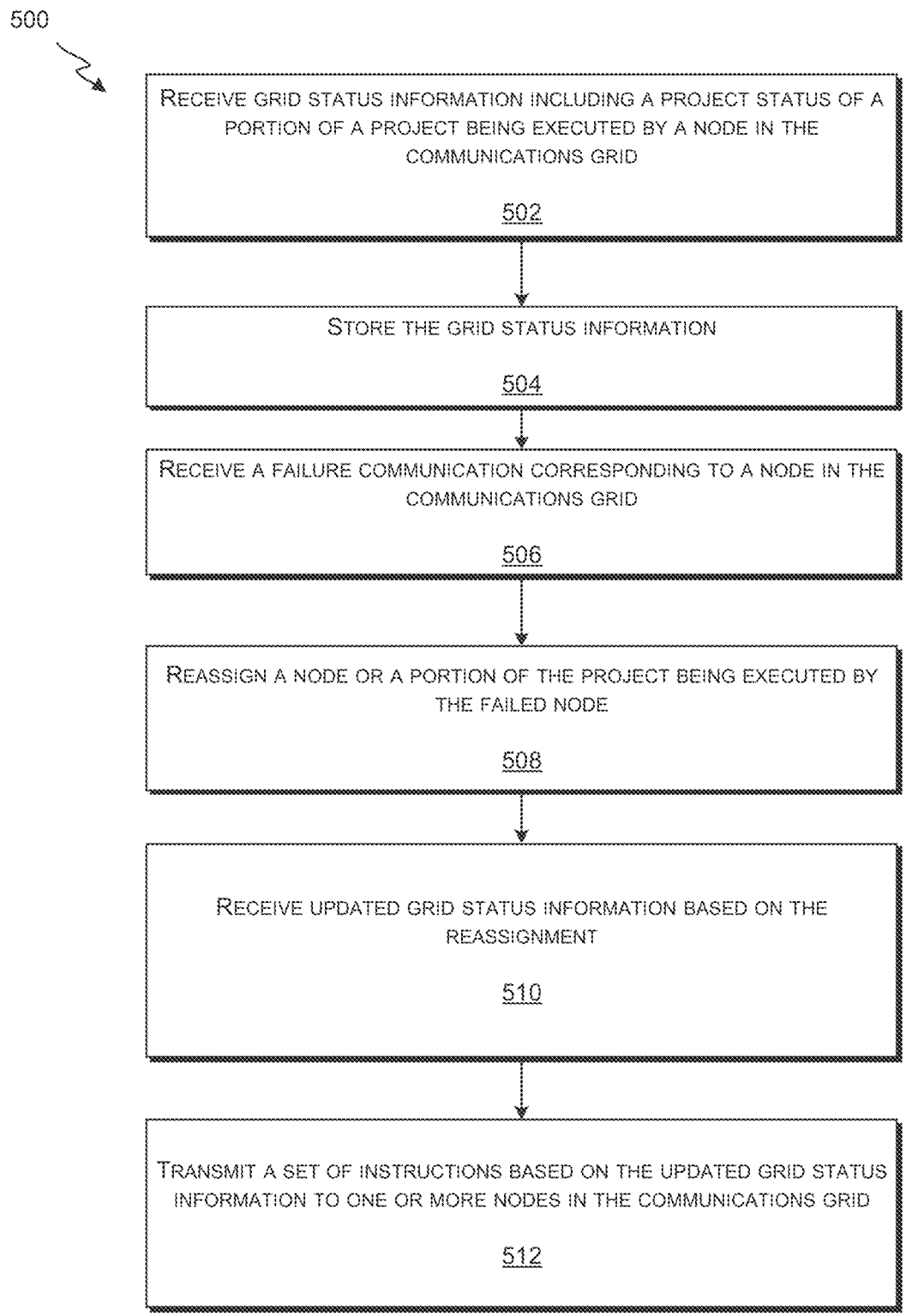
FIG. 5 is a flow chart of an example of a process for adjusting a communications grid or a work project in a communications grid after a failure of a node according to some aspects.

FIG. 5 is a flow chart of an example of a process for adjusting a communications grid or a work project in a communications grid after a failure of a node according to some aspects. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
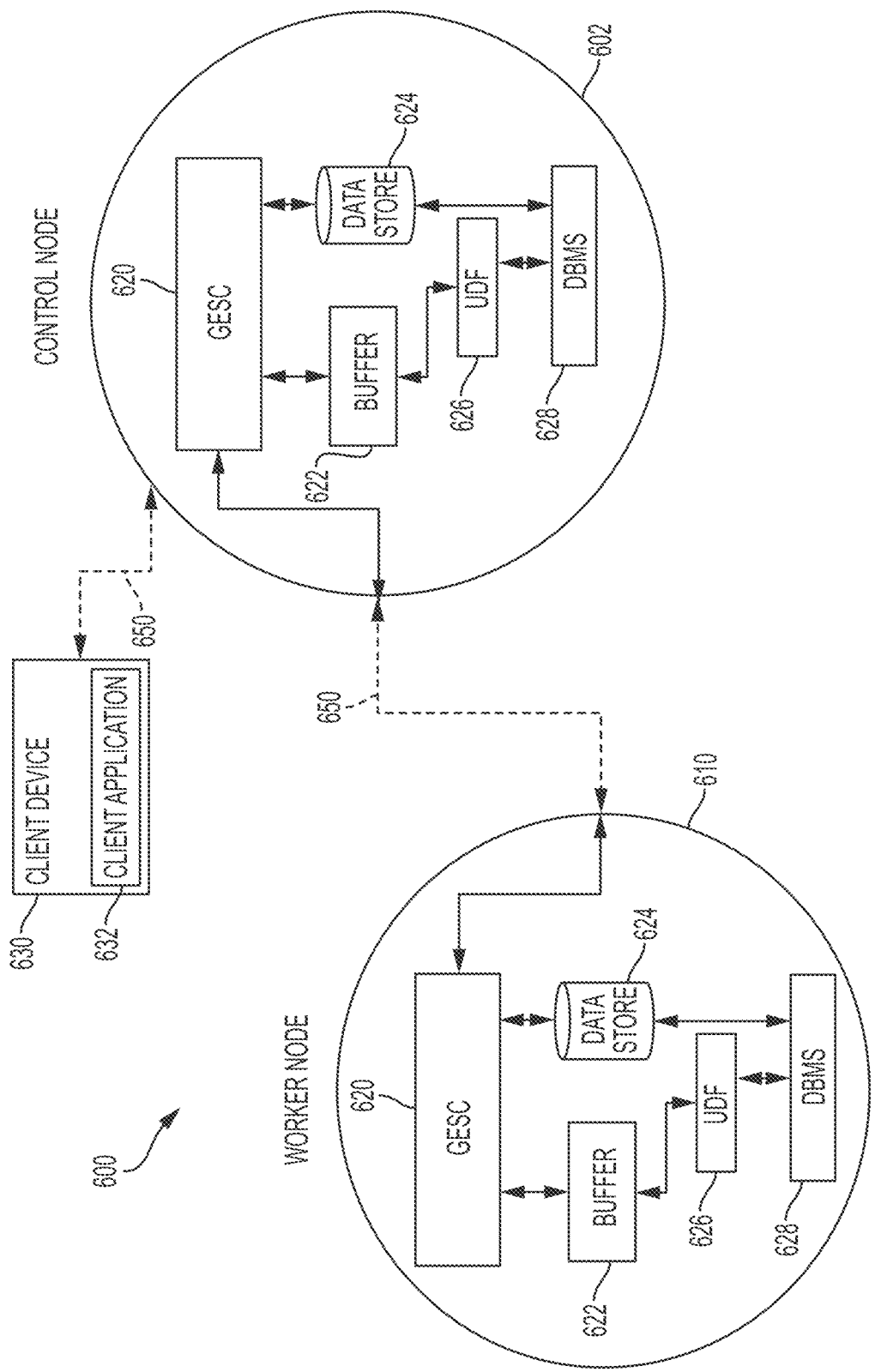
FIG. 6 is a block diagram of a portion of a communications grid computing system including a control node and a worker node according to some aspects.

FIG. 6 is a block diagram of a portion of a communications grid computing system 600 including a control node and a worker node according to some aspects. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via communication path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain examples, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
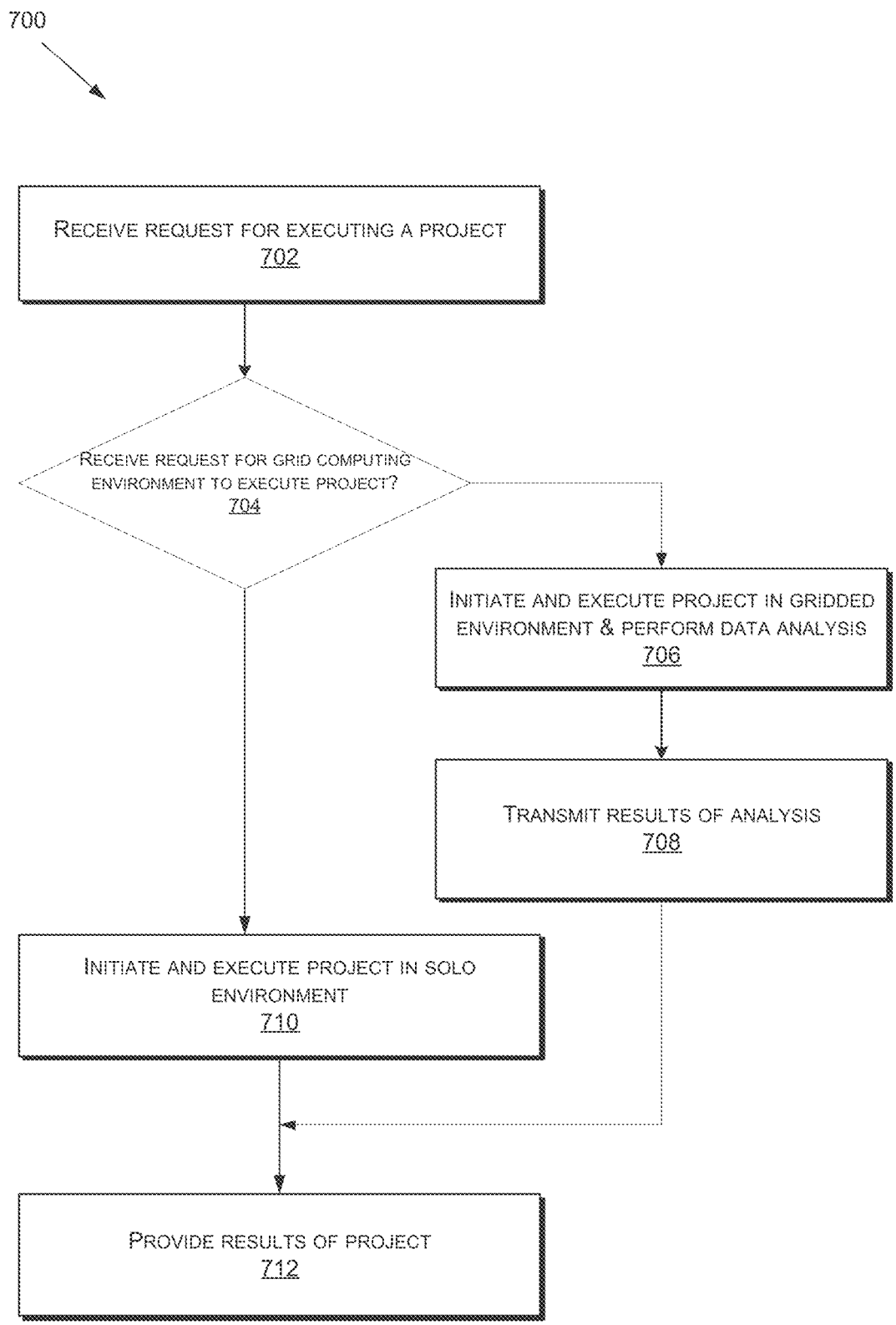
FIG. 7 is a flow chart of an example of a process for executing a data analysis or processing project according to some aspects.

FIG. 7 is a flow chart of an example of a process for executing a data analysis or a processing project according to some aspects. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

Figure 8:
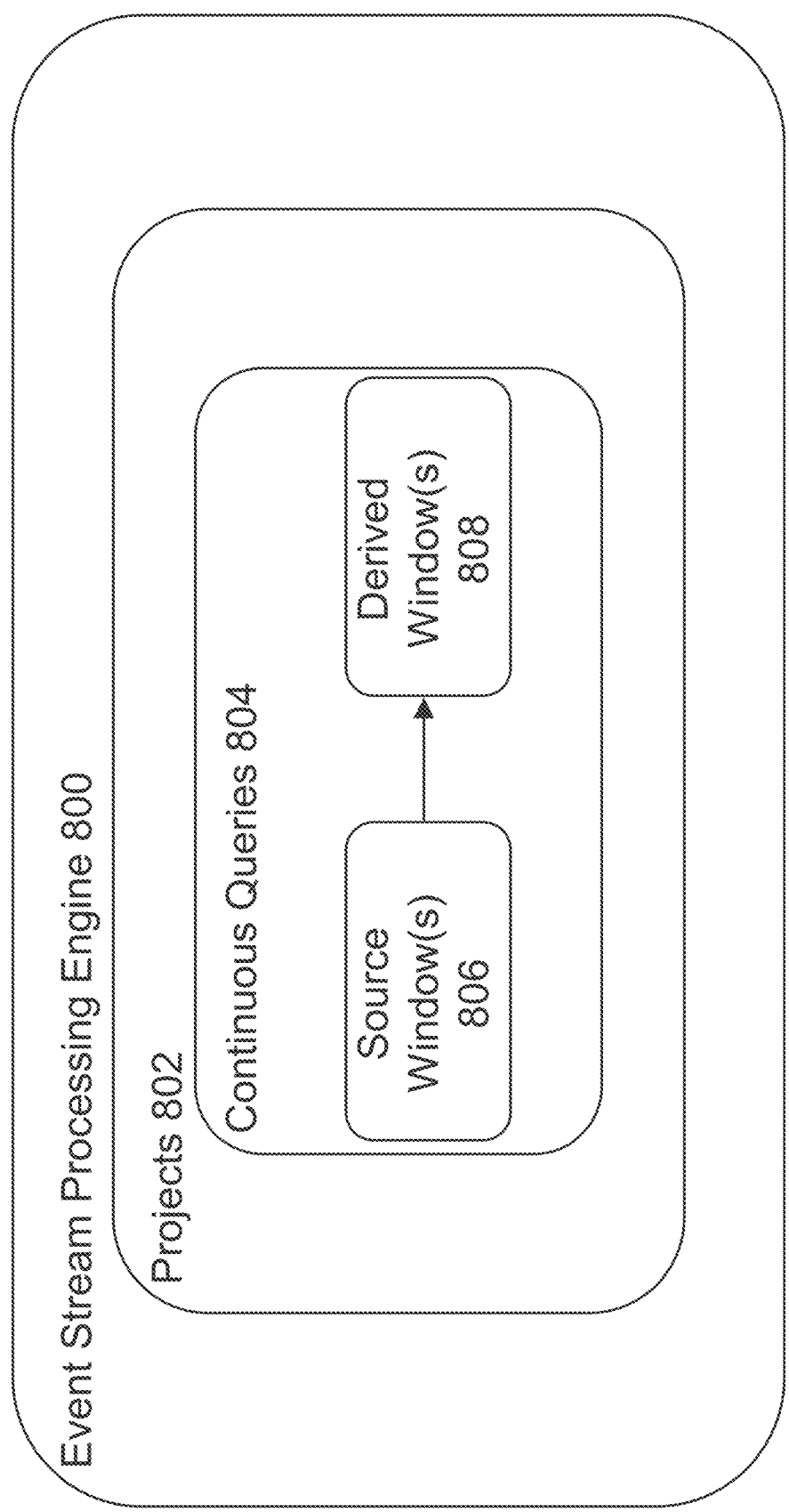
FIG. 8 is a block diagram including components of an Event Stream Processing Engine (ESPE) according to some aspects.

FIG. 8 is a block diagram including components of an Event Stream Processing Engine (ESPE) according to some aspects. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

Figure 9:
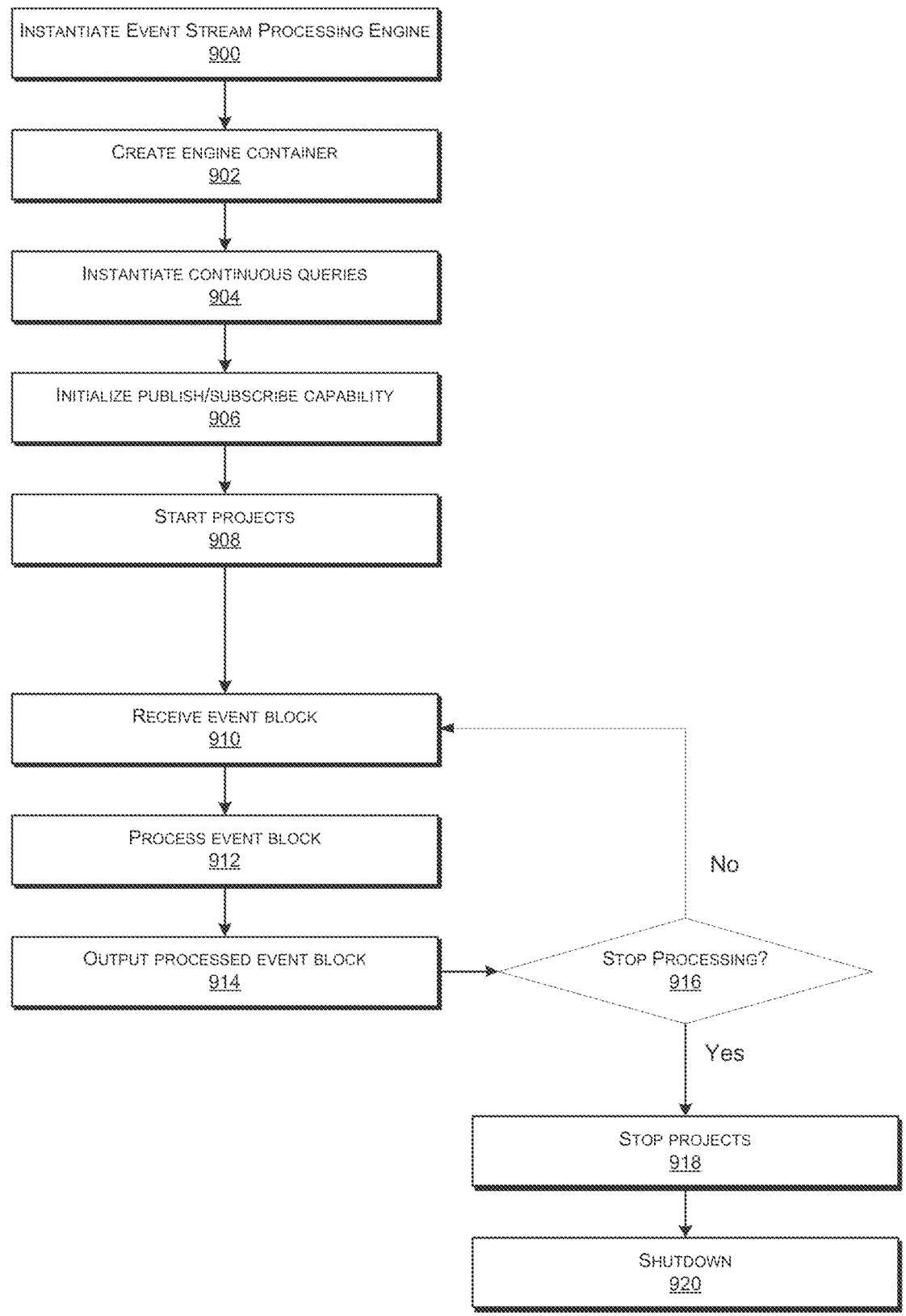
FIG. 9 is a flow chart of an example of a process including operations performed by an event stream processing engine according to some aspects.

FIG. 9 is a flow chart of an example of a process including operations performed by an event stream processing engine according to some aspects. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. Various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

Figure 10:
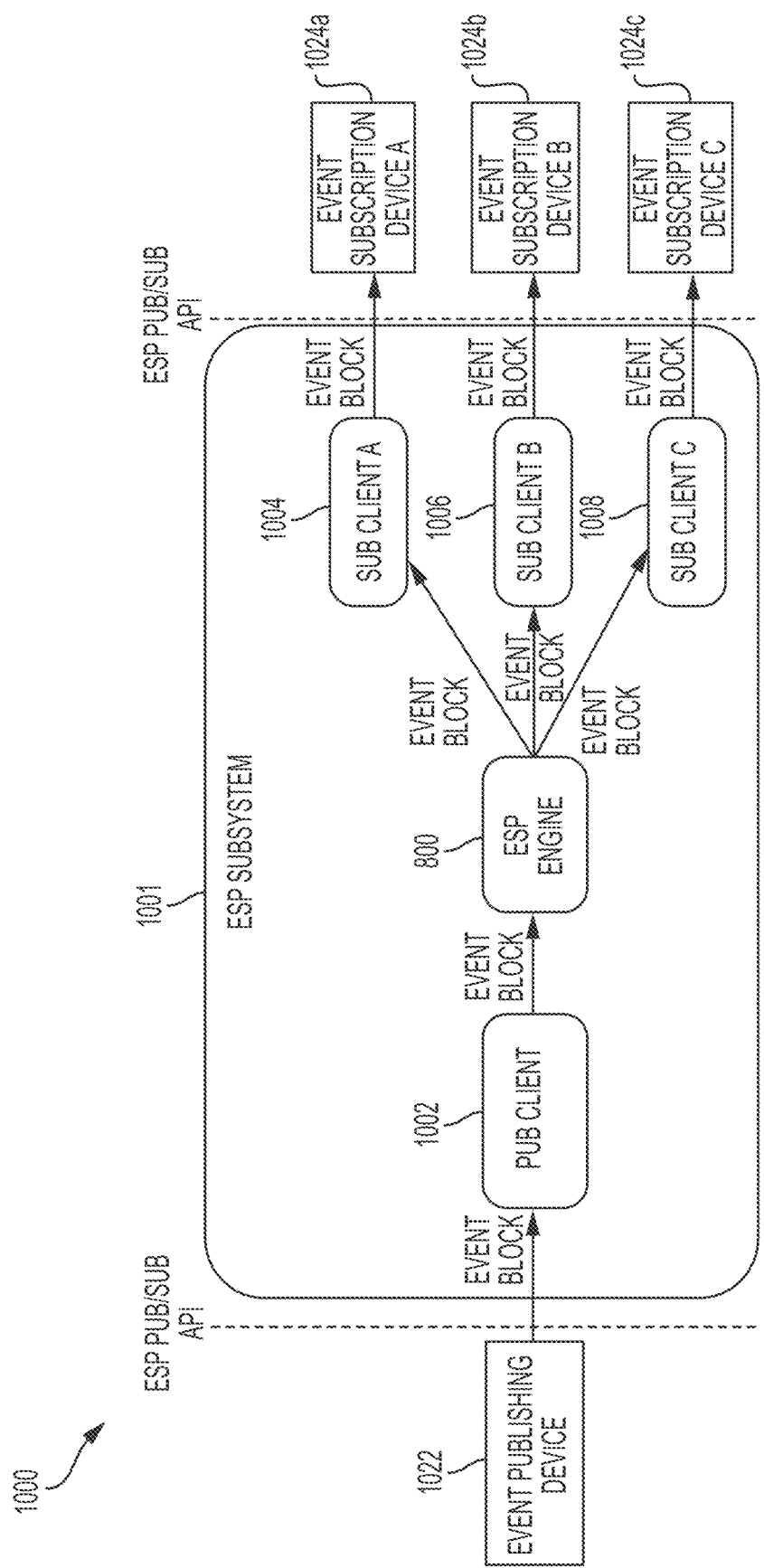
FIG. 10 is a block diagram of an ESP system interfacing between a publishing device and multiple event subscribing devices according to some aspects.

FIG. 10 is a block diagram of an ESP system 1000 interfacing between publishing device 1022 and event subscribing devices 1024*a-c* according to some aspects. ESP system 1000 may include ESP device or subsystem 1001, publishing device 1022, an event subscribing device A 1024*a*, an event subscribing device B 1024*b*, and an event subscribing device C 1024*c*. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a*-*c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some examples, big data is processed for an analytics project after the data is received and stored. In other examples, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the present disclosure provide technical solutions to technical problems, such as computing problems that arise when an ESP device fails which results in a complete service interruption and potentially significant data loss. The data loss can be catastrophic when the streamed data is supporting mission critical operations, such as those in support of an ongoing manufacturing or drilling operation. An example of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, one or more processors and one or more computer-readable mediums operably coupled to the one or more processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
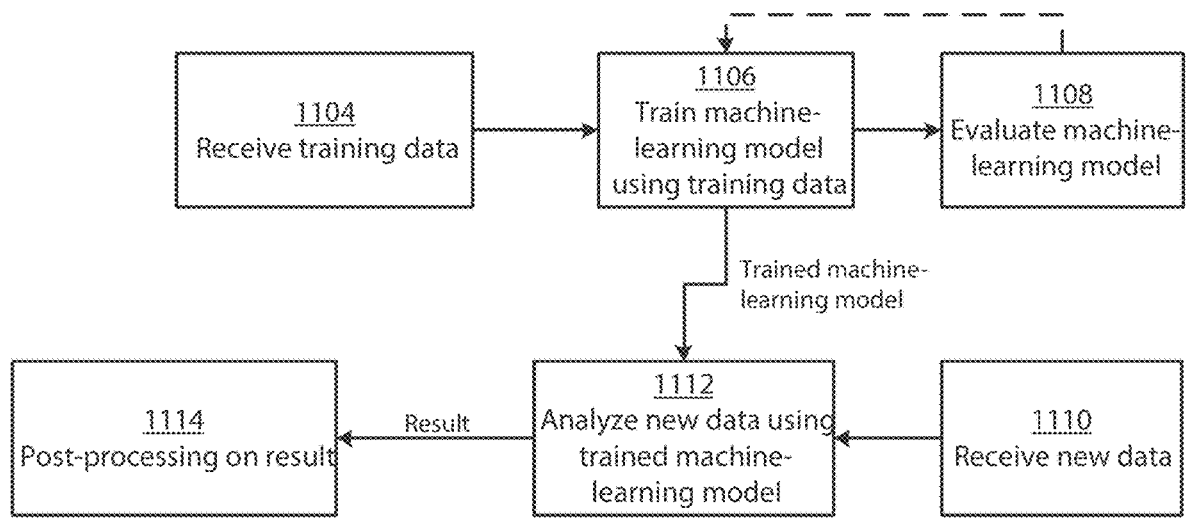
FIG. 11 is a flow chart of an example of a process for generating and using a machine-learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
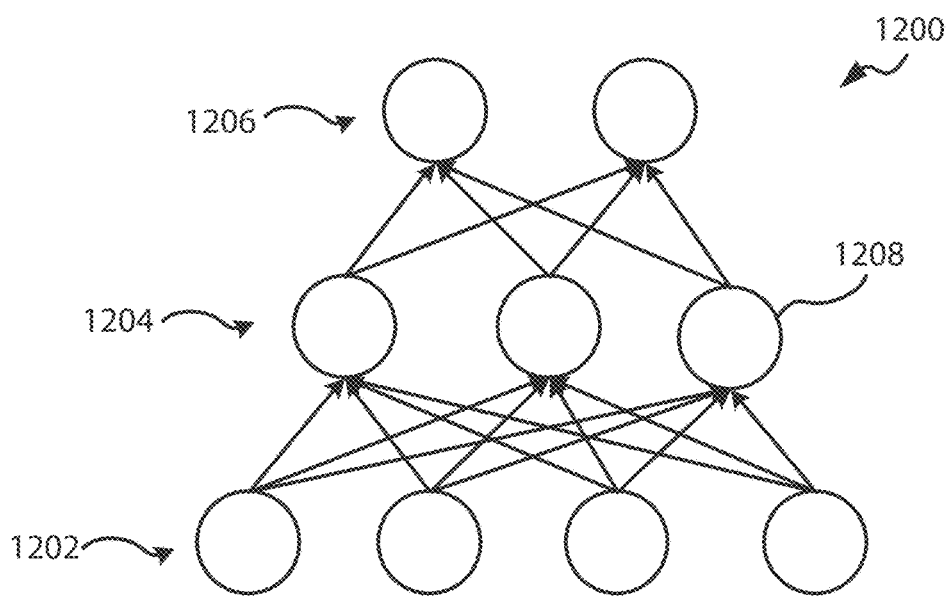
FIG. 12 is a node-link diagram of an example of a neural network according to some aspects.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y=\max(x,0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Figure 13:
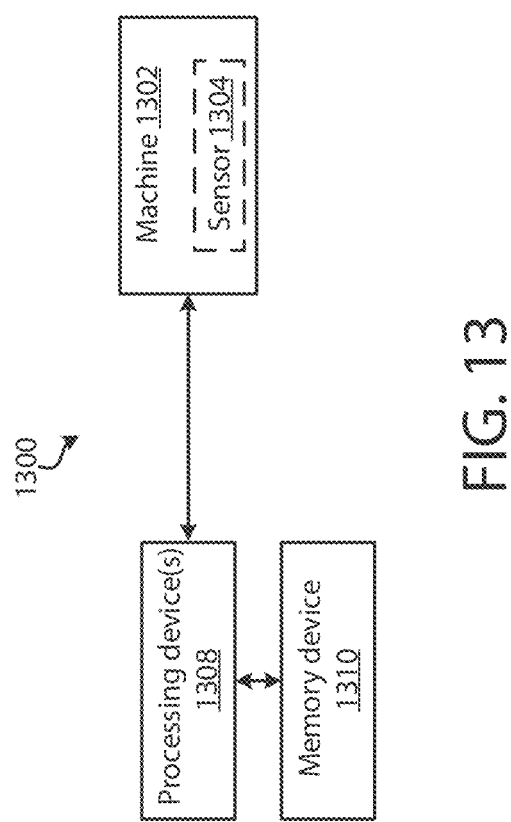
FIG. 13 is a block diagram of an example of an advanced control system for a machine according to some aspects.

FIG. 13 is a block diagram of an example of an advanced control system 1300 for a machine 1302 according to some aspects. The machine 1302 can include an electronic device, an electronic system, a mechanical device, a mechanical system, or any other type of physical system or combination of physical systems. For example, the machine 1302 can be a furnace; a pump; a heater; or a computing device, such as a laptop computer, desktop computer, server, mobile phone, etc. In some examples, the machine 1302 can include one or more subsystems. For example, the machine 1302 can be a furnace formed from multiple subsystems, such as a heating unit, a computing device, a conveyor belt, a fluid pump, a valve, etc.

The machine 1302 can include or be coupled to one or more sensors, such as sensor 1304. In some examples, the sensor(s) are positioned to detect characteristics of the machine 1302, ambient conditions (e.g., near to the machine 1302), or both of these. In an example in which the machine 1302 is a furnace, the sensor(s) can detect a firing rate of the furnace, a feed rate of a material into or through the furnace, a temperature in a bridge-wall section of the furnace, a temperature in a stack section of the furnace, an atmospheric temperature, a humidity, a wind direction, or any combination of these. For example, one sensor may detect the feed rate of the material into or through the furnace, another sensor may detect the temperature in the bridge-wall section of the furnace, another sensor may detect the temperature in the stack section of the furnace, and still another sensor can detect the atmospheric temperature. The sensor(s) can transmit sensor signals indicating the sensed measurements to one or more processing devices 1308.

The processing device(s) 1308 can receive information (e.g., the sensor signals or a time series) from the machine 1302 and make predictions based on the information. For example, the processing device(s) 1308 can receive a time series from the machine 1302 and make predictions about the machine 1302 based on the time series. The system 1300 can also include one or more memory devices 1310, which can include instructions (e.g., program code) that are executable by the processing device(s) 1308 for causing the processing device 1308 to, for example, make the predictions.

In some examples, the processing device(s) 1308 can control operation of a machine, such as the machine 1302 or another machine, based at least in part on the predictions. An example of a process for controlling operation of a machine using predictions is shown in FIG. 14 and described in greater detail below.

Figure 14:
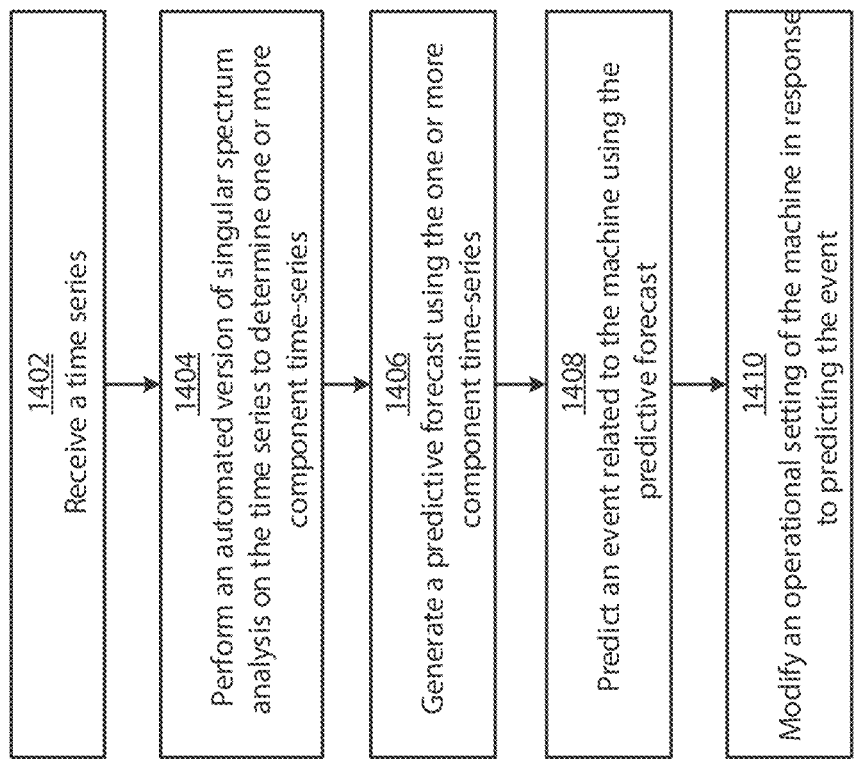
FIG. 14 is a flow chart of an example of a process for controlling operation of a machine using predictions according to some aspects.

FIG. 14 is a flow chart of an example of a process for controlling operation of a machine according to some aspects. Some examples can include more, fewer, or different operations than the operations depicted in FIG. 14. Also, some examples can implement the operations of the process in a different order. The operations below are described with reference to the components of FIG. 13.

In block 1402, a processing device 1308 receives a time series. A time series can include multiple data points arranged in sequential order over a period of time. The time series can be a univariate time series in which the time series has one time-dependent variable or a multivariate time series in which the time series has two or more time-dependent variables.

The time series can relate to the machine 1302, a product, a company, a person, a natural phenomenon, or any combination of these. The processing device 1308 can receive the time series from a machine 1302, a database, a server or computing device, a sensor 1304, or any combination of these.

In block 1404, the processing device 1308 performs an automated version of singular spectrum analysis on the time series to determine one or more component time-series. Singular spectrum analysis (SSA) is a nonparametric spectral estimation method that can be performed on univariate and multivariate time series.

Typical methods of performing singular spectrum analysis can require human involvement, but the automated version of singular spectrum analysis can perform singular spectrum analysis with little or no human involvement. In some examples, the automated version of singular spectrum analysis can enable thousands of time series related to the machine 1302 to be analyzed using singular spectrum analysis at speeds that are impossible for humans to accomplish (e.g., in real time) to make valuable predictions about the machine 1302, such as if an error, failure, and other undesirable condition is going to occur in the future. The processing device 1308 or a machine operator can then use these predictions to take appropriate corrective action or preventative action to improve the functionality of the machine 1302, such as to prevent the machine 1302 from failing. An example of the automated process for performing singular spectrum analysis is shown in FIG. 15.

Figure 15:
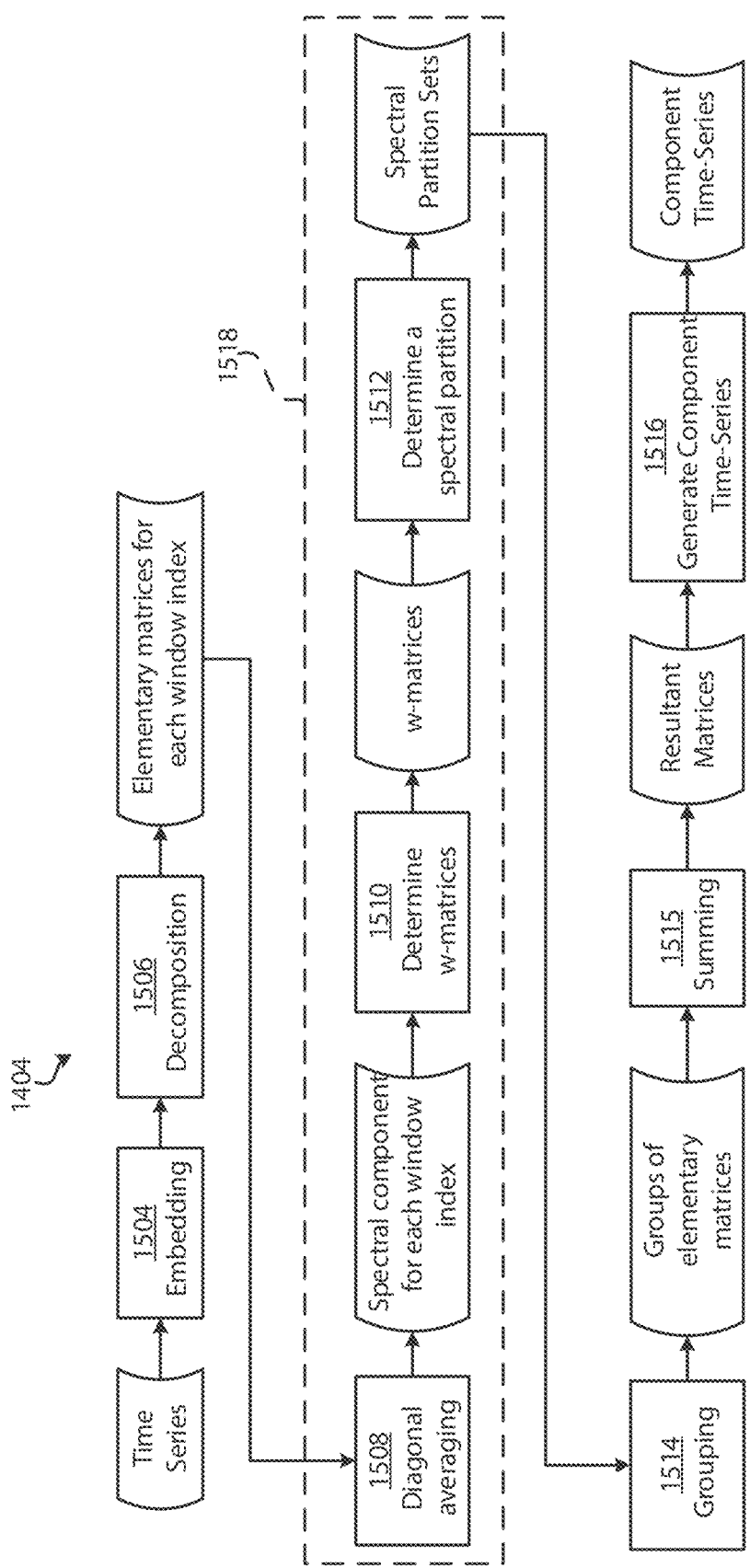
FIG. 15 is a flow chart of an example of a process for performing an automated version of singular spectrum analysis on a time series according to some aspects.

Now referring to FIG. 15, in block 1504, the processing device 1308 performs an embedding operation on a time series. The embedding operation can include forming a trajectory matrix based on the time series. A trajectory matrix can be a multi-dimensional representation of the time series.

As one example, a real-valued univariate time series $X=(x_1, \ldots, x_N)$ can be of length T. If a window length (L) is defined as $(1<L\leq T/2)$ and K is defined as $T-L+1$, then the trajectory matrix (X) can be determined as the matrix of $L \times K$:

$$X = [X_1 : \ldots : X_k] = (x_{ij})_{i,j=1}^{L,K} = \begin{bmatrix} x_1 & x_2 & x_3 & \ldots & x_K \\ x_2 & x_3 & x_4 & \ldots & x_{K+1} \\ x_3 & x_4 & x_5 & \ldots & x_{K+2} \\ \vdots & \vdots & \vdots & \ddots & \vdots \\ x_L & x_{L+1} & x_{L+2} & \ldots & x_T \end{bmatrix}$$

where $X_i = (x_i, x_{i+L-1})^T$, and $(1 \leq i \leq K)$ are lagged vectors of size L. In some examples, the trajectory matrix can be a Hankel matrix.

As another example, a real-valued multivariate time series $\{y_{l,t}\}_{p=1,t=1}^{P,T}$ can be of length T and have P variables. If a window length (L) is defined as $(L<K<T)$ and K is defined as $T-L+1$, then the trajectory matrix (X) can be determined as the matrix of $PL \times K$:

| 1 | 2 | ... K − 1 | K | K + 1 | ... 2K | ... | PK |
|---|---|---|---|---|---|---|---|
| $Y_1^{(1)}$ | $Y_2^{(1)}$ | ... $Y_{T-L}^{(1)}$ | $Y_{T-L+1}^{(1)}$ | $Y_1^{(2)}$ | ... $Y_{T-L+1}^{(2)}$ | ... | ... |

-continued

| 1 | 2 | ... K − 1 | K | K + 1 | ... 2K | ... | PK |
|---|---|---|---|---|---|---|---|
| $Y_2^{(1)}$ | $Y_3^{(1)}$ | ... $Y_{T-L+1}^{(1)}$ | $Y_{T-L+2}^{(1)}$ | $Y_2^{(2)}$ | ... $Y_{T-L+2}^{(2)}$ | ... | ... |
| $Y_3^{(1)}$ | $Y_4^{(1)}$ | ... $Y_{T-L+2}^{(1)}$ | $Y_{T-L+3}^{(1)}$ | $Y_3^{(2)}$ | ... $Y_{T-L+3}^{(2)}$ | ... | ... |
| ... | ... | ... ... | ... | ... | ... ... | ... | ... |
| $Y_{L-1}^{(1)}$ | $Y_L^{(1)}$ | ... $Y_{T-2}^{(1)}$ | $Y_{T-1}^{(1)}$ | $Y_{L-2}^{(2)}$ | ... $Y_{T-1}^{(2)}$ | ... | ... |
| $Y_L^{(1)}$ | $Y_{L+1}^{(1)}$ | ... $Y_{T-1}^{(1)}$ | $Y_T^{(1)}$ | $Y_L^{(2)}$ | ... $Y_T^{(2)}$ | ... | ... |

In block 1506, the processing device 1308 performs a decomposition operation. In some examples, the decomposition operation can include performing singular value decomposition of the trajectory matrix X. Singular value decomposition can include decomposing the trajectory matrix X into eigenvalues and eigenvectors, which can be used to construct elementary matrices.

More specifically, singular value decomposition can be applied to the trajectory matrix such that X=UQV, where U represents the (K×L) matrix that contains left hand eigenvectors, Q represents the diagonal (L×L) matrix that contains eigenvalues, and V represents the (L×L) matrix that contains right hand eigenvectors. In some examples, singular value decomposition can be applied to the trajectory matrix such that $X = \sum_{l=1}^{L} X^l = \sum_{l=1}^{L} u_l q_l v_l'$, where $X^l$ represents a (PK×L) elementary matrix (e.g., a matrix of rank 1), $u_1$ represents a (PK×1) left hand eigenvector, $q_1$ represents the eigenvalue, and $v_1$ represents a (L×1) right hand eigenvector that is associated with the l-th window index. The output of block 1506 can include the elementary matrices.

Next, the processing device 1308 can substantially automatically determine a spectral partition by performing some or all of the operations in dashed box 1518. In contrast, typical singular spectrum analysis requires a human to subjectively determine the spectral partition by visually analyzing graphs of the elementary matrices and eigenvalues, which prevented singular spectrum analysis from being automated in the past. But the specific rules described below (e.g., the operations in dashed box 1518) can enable the processing device 1308 to determine the spectral partition substantially automatically, thereby enabling the automation of singular spectrum analysis.

In block 1508, the processing device 1308 performs diagonal averaging on the elementary matrices to generate spectral components associated with the time series. The diagonal averaging operation can include initially assuming that there is to be a predefined number of groups (M), whereby the predefined number of groups (M) is equal to the window length (L). Then, for each group index (m=1, M), the diagonal average of the elementary matrices can be determined by:

$$\tilde{x}_t^{(m)(p)} = \frac{1}{n_t} \sum_{l=s_t}^{e_t} x_{t-l+1,(p-1)K+l}^{(m)}$$

Where p denotes the p-th variable and K=T−L+1, such that:
$s_t=1$, $e_t=t$, $n_t=t$ for $(1 \leq t < L)$
$s_t=1$, $e_t=L$, $n_t=L$ for $(L \leq t \leq (T-L+1))$
$s_t=(T-t+1)$, $e_t=L$, $n_t=(T-t+1)$ for $((T-L+1) < t \leq T)$
and where T is the total number of time points (or the length) of the time series; t is a single time point from t=1, ..., T; and l is the window index l=1, ..., L. The diagonal averaging operation can result in a spectral component for each window index (i). A spectral component can include all artifacts related to a particular eigenvalue in an eigenspectrum.

In block 1510, the processing device 1308 determines one or more w-correlation matrices between the groups (m). A w-correlation matrix is a matrix of weighted correlation values, or "w-correlation values." In examples in which the original time series is univariate, there will only be one w-correlation matrix. In examples in which the original time series is multivariate, there will be more than one w-correlation matrix.

The processing device 1308 can determine each of the w-correlation matrices according to the following equation:

$$\rho_{i,j}^{(w)(p)} = \frac{\left( \tilde{x}_t^{(i)(p)}, \tilde{x}_t^{(j)(p)} \right)_w}{\left\| \tilde{x}_t^{(i)(p)}, \tilde{x}_t^{(i)(p)} \right\|_w \left\| \tilde{x}_t^{(j)(p)}, \tilde{x}_t^{(j)(p)} \right\|_w}$$

where $\rho_{i,j}^{(w)(p)}$ is the w-correlations matrix associated with variable P; $(\tilde{x}_t^{(i)(p)}, \tilde{x}_t^{(j)(p)})_w = |\mathbb{E}_{\tau=1}^T w_\tau \tilde{x}_t^{(i)(p)} \tilde{x}_t^{(j)(p)}|$; $w_t = \min(t, L, T-t+1)$; w is the weight associated with a particular time point; i is the row index associated with the w-correlation matrix; and j is the column index associated with the w-correlation matrix. The w-correlations matrix can represent the weighted correlations between groups, and can be used to find the dominant spectral components among the window indices l=1, ..., L.

Figure 16:
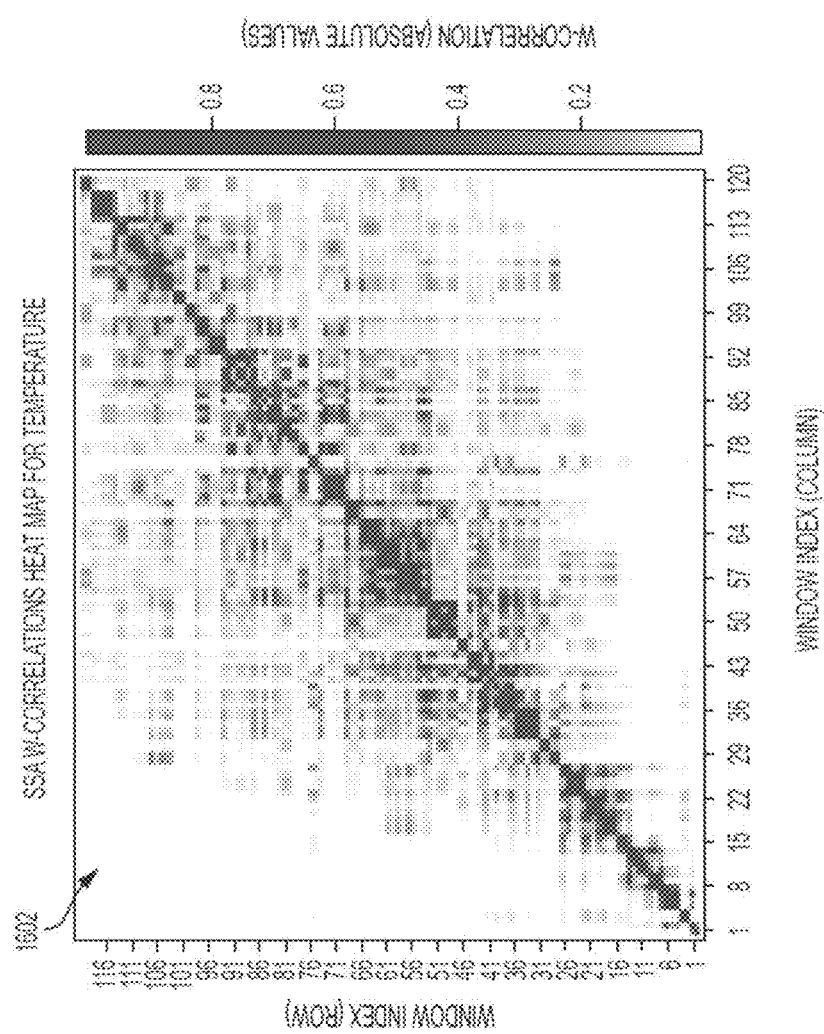
FIG. 16 is a heat map of an example of w-correlation matrix values according to some aspects.

An example of a heat map showing features of a w-correlation matrix is shown in FIG. 16. The heat map 1602 has X-axis values that represent columns in the w-correlation matrix and Y-axis values that represent rows in the w-correlation matrix. The color depicted at each intersecting (X, Y) coordinate in the heat map 1602 can represent the absolute value of the w-correlation at the (column, row) intersection of the w-correlation matrix.

As mentioned above, there will be multiple w-correlation matrices if the original time series is multivariate. So, the processing device 1308 can reduce the multiple w-correlation matrices to a single w-correlation matrix (SWCM) by applying one or more mathematical operations to corresponding w-correlation values of the w-correlation matrices. For example, the processing device 1308 can generate a SWCM in which each w-correlation value is determined by calculating a maximum value, a mean value, a minimum value, and/or a root mean squared value of corresponding matrix elements in the w-correlation matrices. As a specific example, the processing device 1308 can determine a w-correlation value for coordinate (3, 5) of the SWCM by calculating the mean of the w-correlation values at coordinate (3, 5) in some or all of the other w-correlation matrices. The processing device 1308 can repeat this process for each coordinate in the w-correlation matrices to produce the SWCM. Thus, regardless of whether the original time series is univariate or multivariate, the output of block 1510 is a single w-correlation matrix of w-correlation values.

In block 1512, the processing device 1308 determines a spectral partition based on the w-correlations between the groups (m). The spectral partition divides the eigenspectrum into disjoint and contiguous sets (e.g., highest singular-value and lowest singular-value sets), which can be referred to as "spectral partition sets" or "sets" below. In some examples, the spectral partition sets can be determined according to some or all of the process shown in FIG. 17.

Figure 17:
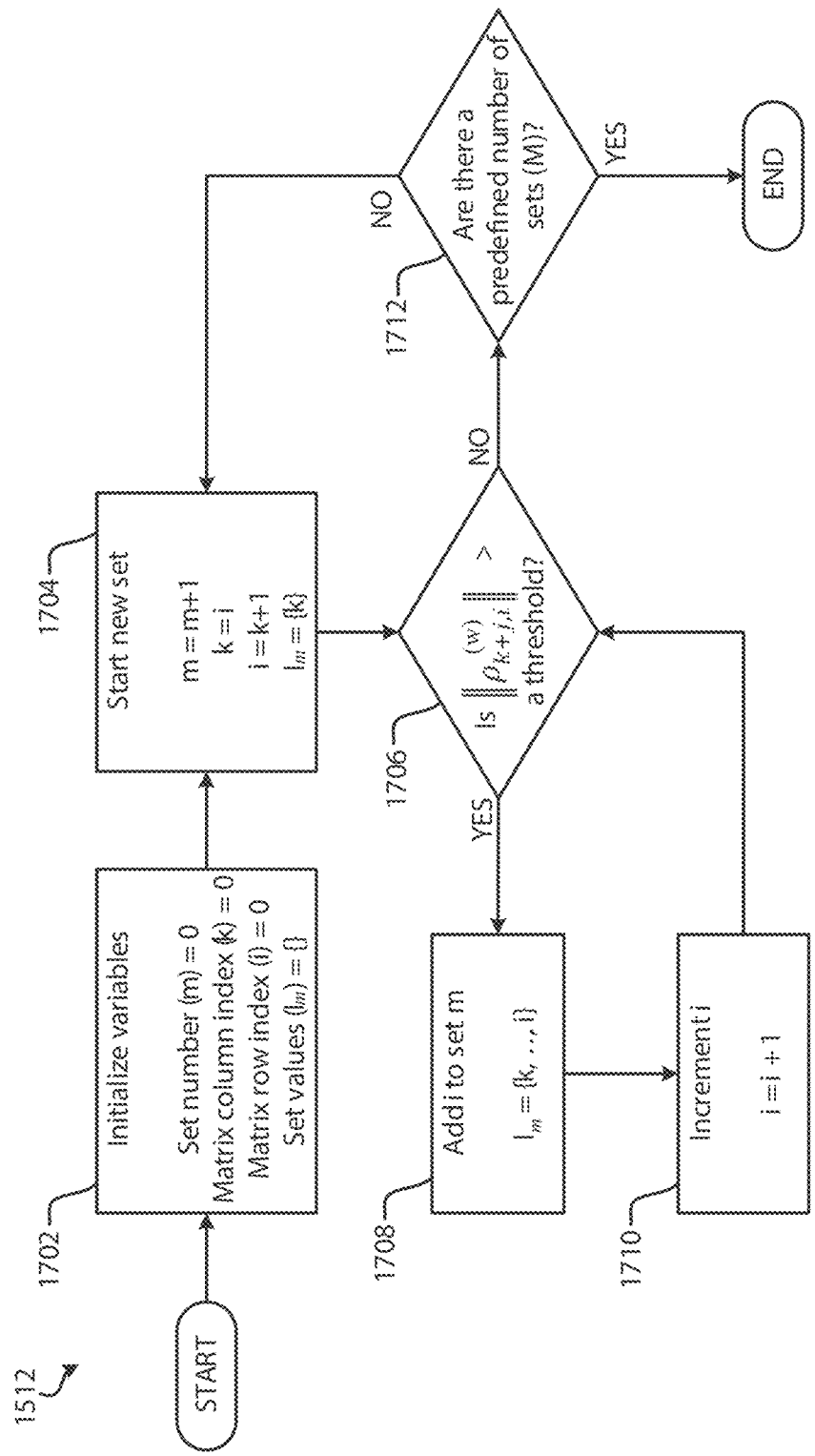
FIG. 17 is a flow chart of an example of a process for performing a grouping step of singular spectrum analysis according to some aspects.

Referring now to FIG. 17, in block 1702, the processing device 1308 initializes variables for use in determining the spectral partition sets. The variables can include the set number (m), the w-correlation matrix column index (k), the w-correlation matrix row index (i), some or all of which can be initialized to zero. Also, the w-correlation values in set number m can be stored in an array ($I_m$), which can be initialized to zero.

In block 1704, the processing device 1308 initializes a new set. To do so, the processing device 1308 can increment the value of m by 1; set the w-correlation matrix column index (k) equal to the w-correlation matrix row index (i); set the w-correlation matrix row index (i) equal to the w-correlation matrix column index (k) plus one; include the w-correlation matrix value at column index (k) in the array $I_m$; or any combination of these.

In block 1706, the processing device 1308 determines if $\|\rho_{k+j,i}^{(w)}\|$ is greater than a predefined threshold, which can be input by a user. $\|\rho_{k+j,i}^{(w)}\|$ can be the w-correlation value at the intersection of (k+j, i). An example of the predefined threshold can be 0.9. If so, the process can proceed to block 1708, where the processing device 1308 can add the w-correlation value at row index (i) to the array $I_m$. The processing device 1308 can then increment the value of i in block 1710, and the process can return to block 1706 and iterate.

If the processing device 1308 determines in block 1706 that $\|\rho_{k+j,i}^{(w)}\|$ is less than or equal to the predefined threshold, the process can proceed to block 1712, where the processing device 1308 can determine if a predefined number of sets (M) have been generated. The predefined number of sets can be input by a user in some examples. If the predefined number of sets (M) have not been generated, the process can proceed back to block 1704 and iterate. Otherwise, the process can end.

The process of FIG. 17 can produce spectral partition sets corresponding to the dominant window indices. This can be represented as $I_m \subseteq \{1, \ldots, L\}$ such that $\|\rho_{i,j}^{(w)}\|$ is greater than the predefined threshold for all $i,j \in I_m$. These sets can then be used to perform some or all of the remaining steps in FIG. 15.

Returning now to FIG. 15, in block 1514 the processing device 1308 uses the spectral partition sets to perform a grouping operation. The grouping operation can involve grouping together elementary matrices corresponding to each of the M sets that were determined from the operations of FIG. 17 to produce M groups. For example, the processing device 1308 can identify the elementary matrices corresponding to one of the M sets, and then combine those elementary matrices together into a group. The processing device 1308 can repeat this process to produce M groups.

In block 1515, the processing device 1308 performs a summing operation in which the processing device 1308 can sum the elementary matrices in each of the M groups to obtain a single resultant matrix for each group. For example, if a group includes elementary matrices $I=i_1, \ldots, i_z$, then the resultant matrix $X_I$ corresponding to this group can be defined as:

$$X_I = X_{i_1} + \ldots + X_{i_z}$$

This process can be repeated to produce M resultant matrices for the M groups.

In block 1516, the processing device 1308 generates component-time series that are additive components of the original time series. The processing device 1308 can generate the component time-series any number of ways. In the example shown in FIG. 15, the processing device 1308 can generate the component-time series by performing diagonal averaging on the resultant matrices. In an alternative example, the processing device 1308 can generate the component-time series by grouping together the spectral components (e.g., from block 1508) according to the groups (e.g., from block 1514). Either way, the component-time series are determined based at least in part on the groups from block 1514. The processing device 1308 can generate M component time-series, which may be used in the remainder of the process shown in FIG. 14.

Referring now back to FIG. 14, the process of FIG. 14 can continue to block 1406, where the processing device 1308 generates a predictive forecast using one or more of the component time-series. The processing device 1308 can use any number and combination of techniques for generating the predictive forecast using the one or more component time-series. In some examples, the processing device 1308 uses a machine-learning model to generate the predictive forecast using the one or more component time-series. For example, the processing device 1308 can train the neural network and then provide one or more of the component time-series as input to the neural network to generate the predictive forecast. Additionally or alternatively, the processing device 1308 can use an autoregressive integrated moving average (ARIMA) model, an ARIMA model with exogenous variables (ARIMAX), an unobserved component model (UCM), an exponential smoothing model (ESM), or any combination of these, to generate the predictive forecast.

In block 1408, the processing device 1308 predicts an event related to the machine 1302 using the predictive forecast. Examples of the event can include anomaly associated with the machine 1302, an error in the machine 1302, a failure of the machine 1302, a shutdown of the machine 1302, a startup of the machine 1302, an overheating of the machine 1302, a physical movement of the machine 1302, or another condition or status of the machine 1302. Other examples of the event can include the machine 1302 receiving certain data, sending certain data, detecting the presence of certain data or computer connections, or any combination of these.

In some examples, the processing device 1308 can compare a predicted value in the predictive forecast to a preset value stored in memory and known to be indicative of a particular type of event. A user, distributer, manufacturer, or installer may provide the preset value indicative of the event as input. If the predicted value is within a certain tolerance range (e.g., +/−0.1) of the preset value, the processing device 1308 can determine that the particular type of event is occurring or is likely to occur in the future. Alternatively, if the processing device 1308 determines that the predicted value meets or exceeds the preset value, the processing device 1308 can determine that the particular type of event is occurring or is likely to occur in the future. Alternatively, if the processing device 1308 determines that the predicted value is below the preset value, the processing device 1308 can determine that the particular type of event is occurring or is likely to occur in the future.

In some examples, the processing device 1308 can compare a pattern of predicted values in the predictive forecast to a pattern of preset values stored in memory and known to be indicative of a particular type of event. The pattern of preset values can be a predetermined pattern provided as input by a user, distributer, manufacturer, installer, etc. For example, the processing device 1308 can analyze the predicted values in the predictive forecast to determine if they form a similar shape as (or have values within a preset tolerance range of) the pattern of present values associated with the particular type of event. For instance, the processing device 1308 can determine if the predicted values include a high peak followed by a sharp dip, which can be a shape associated with the particular type of event. If so, the processor can determine that, for example, the particular type of event is occurring or is likely to occur in the future. The processing device 1308 can use any number and combination of techniques to determine if a particular type of event is occurring or is likely to occur in the future.

In block 1410, the processing device 1308 causes an operational setting of the machine 1302 to be modified in response to predicting the event. For example, the processing device 1308 can transmit commands to the machine 1302 or another device associated with the machine to modify the operational setting of the machine 1302. In some examples, modifying the operational setting can bring about a physical change in the physical operation of the machine 1302.

Modifying the operational setting of the machine 1302 may include configuring the operational setting to avoid the event or reduce the likelihood of the event occurring. For example, the event can be related to the machine 1302 overheating. To reduce the likelihood of the event occurring, the processing device 1308 can configure the operational setting to (i) shutdown the machine 1302 for a period of time; (ii) put the machine 1302 into an idle state or another operational state (e.g., that emits less heat); (iii) turn on an air conditioner, fan, or other cooling device to cool the machine 1302; or (iv) any combination of these.

As another example, the machine 1302 can be a robot or vehicle moving around in real space, and the event can include the robot colliding with a physical object in real space. The processing device 1308 may predict that if the machine 1302 maintains its current path, direction, or speed, it will collide with a wall, another car, or another physical object. To reduce the likelihood of the event occurring, the processing device 1308 can cause the machine 1302 to turn, change speed, or move in another direction.

As still another example, the machine 1302 can be for physically manipulating a material, such as rubber. And the event can include material becoming too hot, becoming too cool, cooling too quickly, becoming brittle, deforming in shape, or having another property. To reduce the likelihood of the event occurring, the processing device 1308 can cause adjust a curing time for the material, change a temperature at which the material is cured, open a physical covering or a press of the machine 1302, or otherwise cause the material to be physically manipulated.

Additionally or alternatively, the processing device 1308 can transmit a communication related to the event to a remote computing device. In some examples, the communication can include indicia of the event. The communication can cause the remote computing device to (i) output an alert or notification so that an operator of the machine 1302 can take action; (ii) store the indicia of the event in a remote database for later access and use; or (iii) both of these.

Multivariate Example

Figure 18:
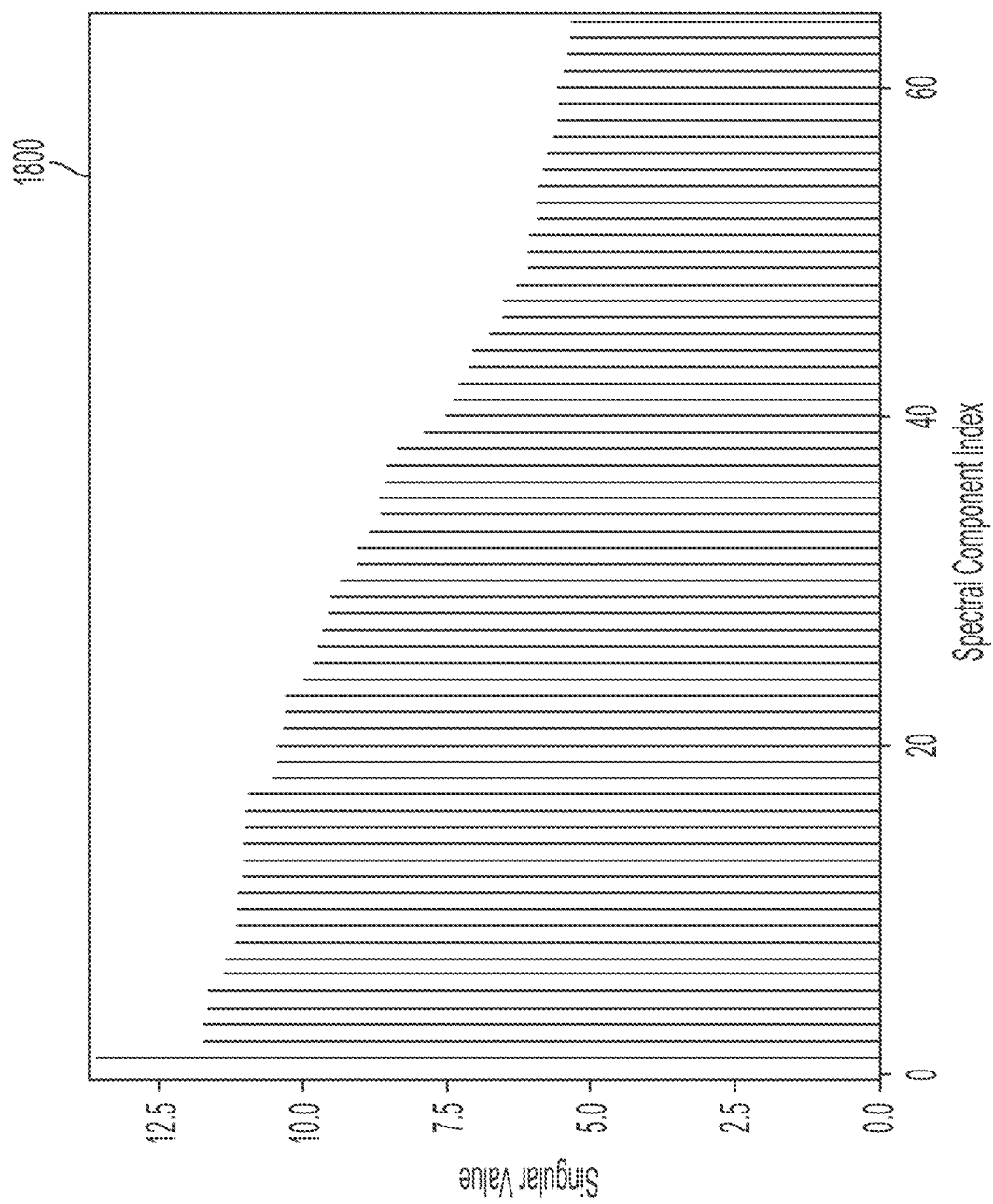
FIG. 18 depicts a graph of an example of singular values corresponding to singular value components determined by performing multivariate singular spectrum analysis (MSSA) on a multivariate time series according to some aspects.
Figure 20:
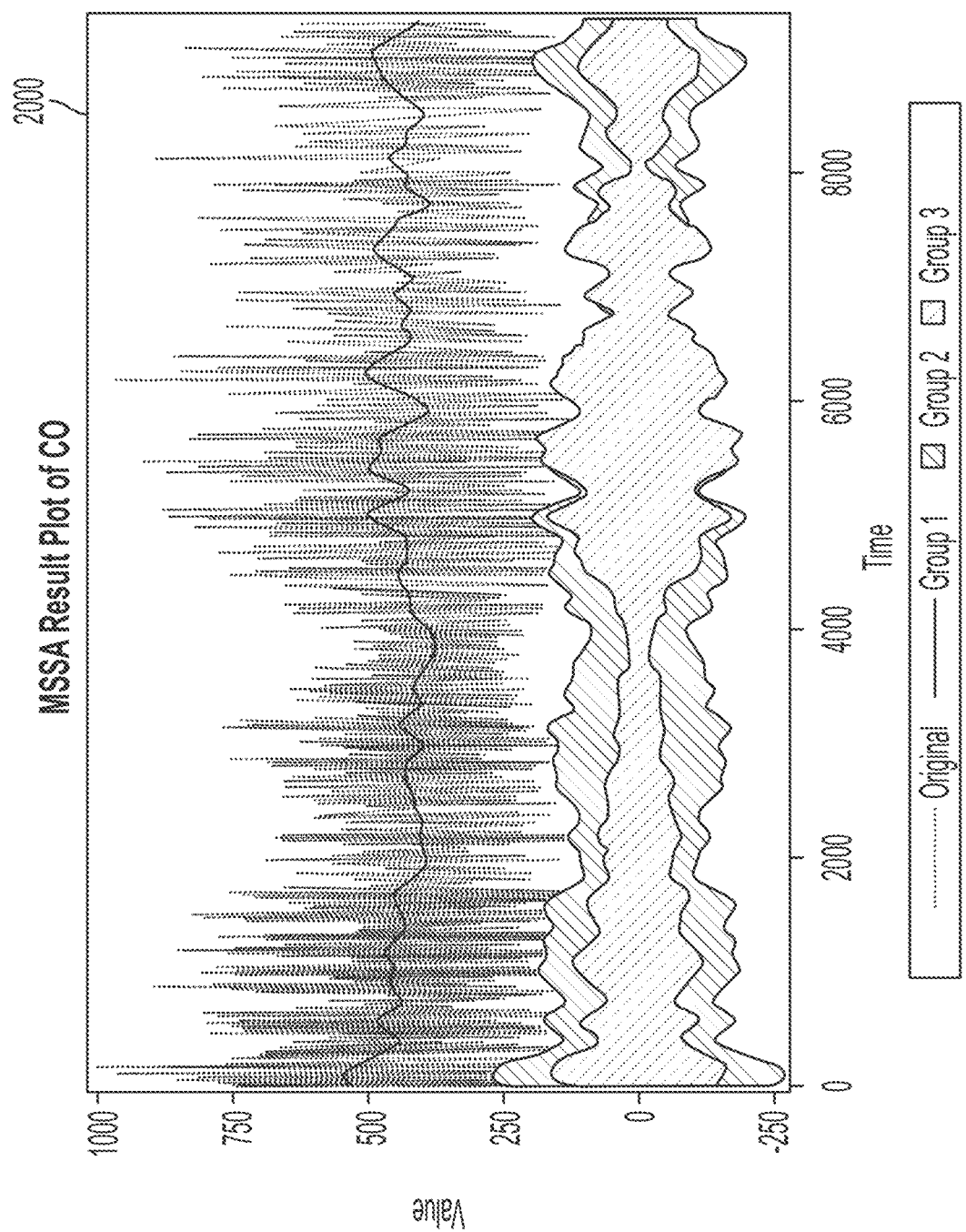
FIG. 20 depicts a graph of an example of component time-series relating to carbon monoxide according to some aspects.
Figure 21:
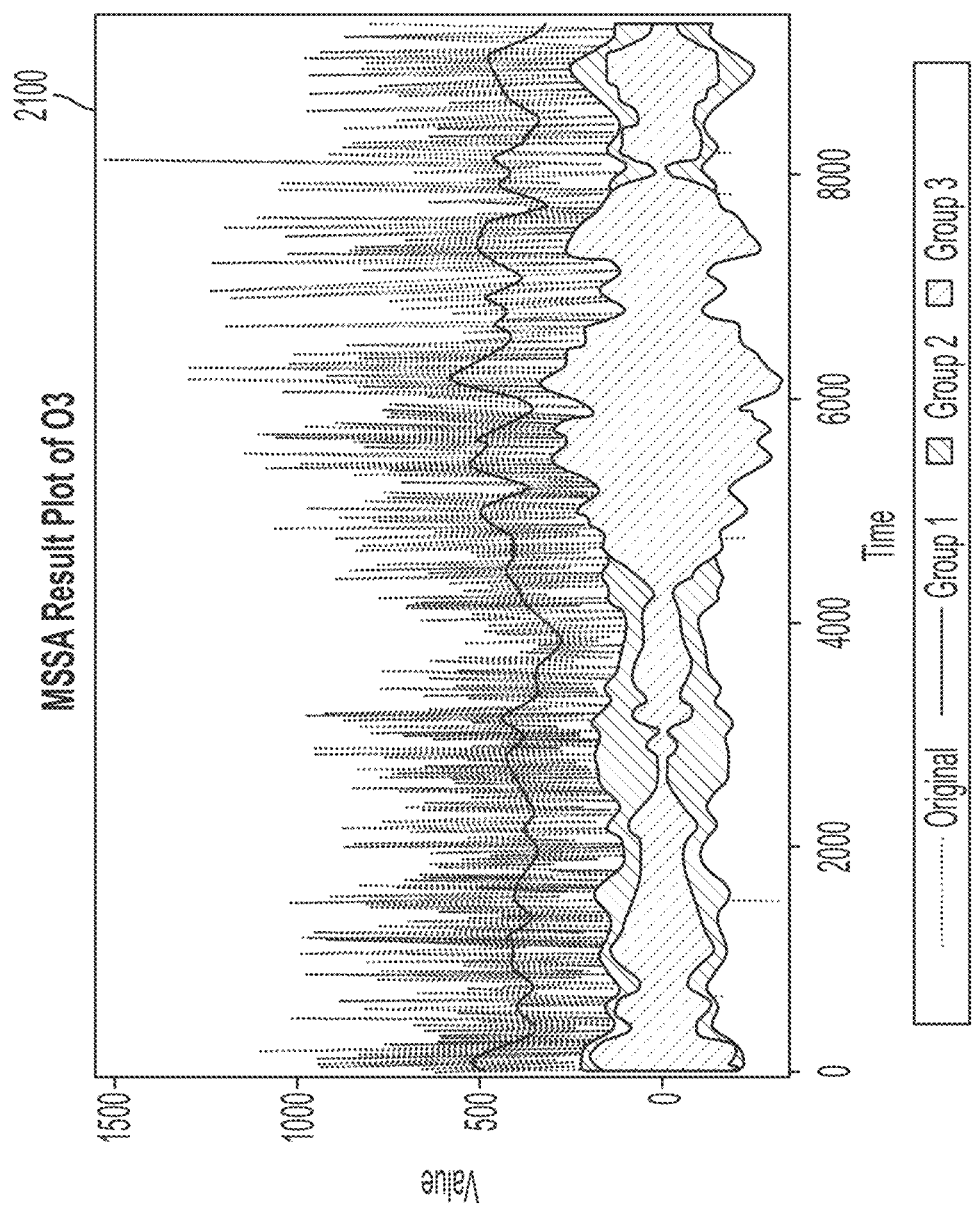
FIG. 21 depicts a graph of an example of component time-series relating to ozone (trioxygen) according to some aspects.

As one specific example, a multivariate time series can include 9,357 simulated measurements of carbon monoxide (CO) and ozone (trioxygen, $O_3$) readings in an environment over time. Singular spectrum analysis can be automatically applied to the multivariate time series in accordance with the operations shown in FIG. 15, with a maximum group number (M) of 3 and a window length (L) of 168 (approximately 7 days). During this process, spectral components are determined. FIG. 18 depicts a graph 1800 of an example of the singular values of each spectral component. A larger singular value can indicate that the singular value component captures a larger portion of the total variation in the original multivariate time-series. And a smaller singular value can indicate that the singular value component captures a smaller portion of the total variation in the original multivariate time-series. Next, groups can be automatically determined based on the singular value. FIG. 19 depicts a table 1900 showing an example of such groupings, in which observations ("Obs") 2 and 3 are grouped together into Group 2, and observations 4 and 5 are grouped together into Group 3. Finally, component time-series can be determined for each group. Examples of the component-time series associated with carbon monoxide are shown in the graph 2000 of FIG. 20. And examples of the component-time series associated with ozone are shown in the graph 2100 of FIG. 21. Some or all of these component-time series can be converted into one or more predictive forecasts, which in turn may be usable to control operation of a machine.

General

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

In the previous description, for the purposes of explanation, specific details are set forth in order to provide a thorough understanding of examples of the technology. But various examples can be practiced without these specific details. The figures and description are not intended to be restrictive.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims.

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. And a process can have more or fewer operations than are depicted in a figure. A process can correspond to a method, a function, a procedure, a subroutine, a subprogram, etc. When a process corresponds to a function, its termination can correspond to a return of the function to the calling function or the main function.

The invention claimed is:

1. A method comprising:
receiving, by a processing device, a time series having one or more time-dependent variables, the time series being associated with a machine;
performing, by the processing device, singular spectrum analysis on the time series at least partially by:
generating a trajectory matrix from the time series, the trajectory matrix being a multi-dimensional representation of the time series, wherein the multi-dimensional representation of the time series has at least one dimension that is dependent on how many time-dependent variables are present in the time series;
performing singular value decomposition on the trajectory matrix to generate elementary matrices;
generating spectral components associated with the time series by performing diagonal averaging on the elementary matrices; and
automatically categorizing the elementary matrices into a plurality of groups by:
generating one or more w-correlation matrices based on the spectral components, each w-correlation matrix being generated by determining weighted correlations between a respective pair of the spectral components associated with a respective time-dependent variable present in the time series;
determining w-correlation values based on the one or more w-correlation matrices;
categorizing the w-correlation values into a predefined number of w-correlation sets such that, for each w-correlation set in the predefined number of w-correlation sets, all of the w-correlation values in the w-correlation set are above a predefined threshold value; and
forming the plurality of groups based on the predefined number of w-correlation sets, each respective group in the plurality of groups including a respective subset of the elementary matrices corresponding to the w-correlation values in a respective w-correlation set among the predefined number of w-correlation sets; and
determining a plurality of component time-series based on the plurality of groups;
generating, by the processing device, a predictive forecast using the plurality of component time-series;
predicting, by the processing device, an event related to the machine using the predictive forecast; and
controlling, by the processing device, the machine by modifying an operational setting of the machine in response to the predicted event.

2. The method of claim 1, wherein the predefined number of w-correlation sets and the predefined threshold value are both set by a user prior to the singular spectrum analysis being performed.

3. The method of claim 1, wherein generating the predictive forecast comprises using a machine-learning model to generate the predictive forecast.

4. The method of claim 3, further comprising training the machine-learning model prior to generating the predictive forecast to transform the machine-learning model into a trained state.

5. The method of claim 1, wherein the time series is univariate.

6. The method of claim 1, wherein the time series is multivariate, and wherein performing singular spectrum analysis on the time series involves performing multivariate singular spectrum analysis (MSSA) on the time series.

7. The method of claim 6, wherein the one or more w-correlation matrices include a plurality of w-correlation matrices, and wherein the w-correlation values are derived from the plurality of w-correlation matrices.

8. The method of claim 7, further comprising determining each of the w-correlation values by calculating a maximum value, a mean value, a minimum value, or a root mean squared value of corresponding matrix elements in the plurality of w-correlation matrices.

9. The method of claim 1, wherein:
the event comprises an anomaly related to the machine; and
modifying the operational setting of the machine comprises configuring the operational setting to reduce a likelihood of the anomaly.

10. A system comprising:
a processing device; and
a memory device including instructions that are executable by the processing device for causing the processing device to perform operations comprising:
receiving a time series having one or more time-dependent variables, the time series being associated with a machine;
performing singular spectrum analysis on the time series at least partially by:
generating a trajectory matrix from the time series, the trajectory matrix being a multi-dimensional representation of the time series, wherein the multi-dimensional representation of the time series has at least one dimension that is dependent on how many time-dependent variables are present in the time series;
performing singular value decomposition on the trajectory matrix to generate elementary matrices;
generating spectral components associated with the time series by performing diagonal averaging on the elementary matrices; and
automatically categorizing the elementary matrices into a plurality of groups by:
generating one or more w-correlation matrices based on the spectral components, each w-correlation matrix being generated by determining weighted correlations between a respective pair of the spectral components associated with a respective time-dependent variable present in the time series;
determining w-correlation values based on the one or more w-correlation matrices;
categorizing the w-correlation values into a predefined number of w-correlation sets such that, for each w-correlation set in the predefined number of w-correlation sets, all of the w-correlation values in the w-correlation set are above a predefined threshold value; and
forming the plurality of groups based on the predefined number of w-correlation sets, each respective group in the plurality of groups including a respective subset of the elementary matrices corresponding to the w-correlation values in a respective w-correlation set among the predefined number of w-correlation sets; and determining a plurality of component time-series based on the plurality of groups;

generating a predictive forecast using the plurality of component time-series;

predicting an event related to the machine using the predictive forecast; and controlling the machine by modifying an operational setting of the machine in response to the predicted event.

11. The system of claim 10, wherein the predefined number of w-correlation sets and the predefined threshold value are both set by a user prior to the singular spectrum analysis being performed.

12. The system of claim 10, wherein generating the predictive forecast comprises using a machine-learning model to generate the predictive forecast.

13. The system of claim 12, wherein the operations further include training the machine-learning model prior to generating the predictive forecast to transform the machine-learning model into a trained state.

14. The system of claim 10, wherein the time series is univariate.

15. The system of claim 10, wherein the time series is multivariate, and wherein performing singular spectrum analysis on the time series involves performing multivariate singular spectrum analysis (MSSA) on the time series.

16. The system of claim 15, wherein the one or more w-correlation matrices include a plurality of w-correlation matrices, and wherein the w-correlation values are derived from the plurality of w-correlation matrices.

17. The system of claim 16, wherein the wherein the operations include determining each of the w-correlation values by calculating a maximum value, a mean value, a minimum value, or a root mean squared value of corresponding matrix elements in the plurality of w-correlation matrices.

18. The system of claim 10, wherein:
the event comprises an anomaly related to the machine; and
modifying the operational setting of the machine comprises configuring the operational setting to reduce a likelihood of the anomaly.

19. A non-transitory computer-readable medium comprising instructions that are executable by a processing device for causing the processing device to perform operations including:
receiving a time series having one or more time-dependent variables, the time series being associated with a machine;
performing singular spectrum analysis on the time series at least partially by:
generating a trajectory matrix from the time series, the trajectory matrix being a multi-dimensional representation of the time series, wherein the multi-dimensional representation of the time series has at least one dimension that is dependent on how many time-dependent variables are present in the time series;
performing singular value decomposition on the trajectory matrix to generate elementary matrices;
generating spectral components associated with the time series by performing diagonal averaging on the elementary matrices; and
automatically categorizing the elementary matrices into a plurality of groups by:
generating one or more w-correlation matrices based on the spectral components, each w-correlation matrix being generated by determining weighted correlations between a respective pair of the spectral components associated with a respective time-dependent variable present in the time series;
determining w-correlation values based on the one or more w-correlation matrices;
categorizing the w-correlation values into a predefined number of w-correlation sets such that, for each w-correlation set in the predefined number of w-correlation sets, all of the w-correlation values in the w-correlation set are above a predefined threshold value; and
forming the plurality of groups based on the predefined number of w-correlation sets, each respective group in the plurality of groups including a respective subset of the elementary matrices corresponding to the w-correlation values in a respective w-correlation set among the predefined number of w-correlation sets; and
determining a plurality of component time-series based on the plurality of groups;
generating a predictive forecast using the plurality of component time-series;
predicting an event related to the machine using the predictive forecast; and
controlling the machine by modifying an operational setting of the machine in response to the predicted event.

20. The non-transitory computer-readable medium of claim 19, wherein the predefined number of w-correlation sets and the predefined threshold value are both set by a user prior to the singular spectrum analysis being performed.

21. The non-transitory computer-readable medium of claim 19, wherein generating the predictive forecast comprises using a machine-learning model to generate the predictive forecast.

22. The non-transitory computer-readable medium of claim 21, wherein the operations further include training the machine-learning model prior to generating the predictive forecast to transform the machine-learning model into a trained state.

23. The non-transitory computer-readable medium of claim 19, wherein the time series is univariate.

24. The non-transitory computer-readable medium of claim 19, wherein the time series is multivariate, and wherein performing singular spectrum analysis on the time series involves performing multivariate singular spectrum analysis (MSSA) on the time series.

25. The non-transitory computer-readable medium of claim 24, wherein the one or more w-correlation matrices include a plurality of w-correlation matrices, and wherein the w-correlation values are derived from the plurality of w-correlation matrices.

26. The non-transitory computer-readable medium of claim 25, wherein the wherein the operations include determining each of the w-correlation values by calculating a maximum value, a mean value, a minimum value, or a root mean squared value of corresponding matrix elements in the plurality of w-correlation matrices.

27. The non-transitory computer-readable medium of claim 19, wherein:
the event comprises an anomaly related to the machine; and
modifying the operational setting of the machine comprises configuring the operational setting to reduce a likelihood of the anomaly.

* * * * *